United States Patent
Clark et al.

(10) Patent No.: US 11,809,630 B1
(45) Date of Patent: Nov. 7, 2023

(54) USING A HAPTIC EFFECTS LIBRARY TO DETERMINE WHETHER TO PROVIDE PREDEFINED OR PARAMETRICALLY-DEFINED HAPTIC RESPONSES, AND SYSTEMS AND METHODS OF USE THEREOF

(71) Applicant: Meta Platforms Technologies, LLC, Menlo Park, CA (US)

(72) Inventors: Justin Clark, Kirkland, WA (US); Patrick Christopher Sebring, Seattle, WA (US); Jessica Hartcher-O'Brien, Redmond, WA (US); Daylon Curtis Walden, Sammamish, WA (US); Sarah Sykes, Kirkland, WA (US); Ali Israr, Bothell, WA (US); Nitzan Bartov, Brooklyn, NY (US); Juha Pekka Kuikka, Seattle, WA (US); Jeffrey Skaanland, Seattle, WA (US); Forrest Smith, Seattle, WA (US); Anis Ahmad, Kirkland, WA (US); Andrew Doxon, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/080,690

(22) Filed: Dec. 13, 2022

Related U.S. Application Data

(60) Provisional application No. 63/333,528, filed on Apr. 21, 2022.

(51) Int. Cl.
*G06F 3/01* (2006.01)

(52) U.S. Cl.
CPC .................................. *G06F 3/016* (2013.01)

(58) Field of Classification Search
CPC ...... G06F 3/016; G06F 3/04886; G06F 3/041; G06F 3/0488
See application file for complete search history.

(56) References Cited

U.S. PATENT DOCUMENTS

| | | |
|---|---|---|
| 8,902,050 B2 | 12/2014 | Heubel et al. |
| 9,928,699 B2 | 3/2018 | Moussette et al. |

(Continued)

*Primary Examiner* — Mong-Shune Chung
(74) *Attorney, Agent, or Firm* — Morgan, Lewis & Bockius LLP

(57) ABSTRACT

Methods and systems using a haptics library to determine whether to provide predefined haptic responses or parametrically-defined haptic responses are disclosed. A method includes receiving a desired semantic attribute for a haptic response to be provided while a user is using an application that is executing on an electronic device. In accordance with a determination, made by the haptics library that is distinct from the application and that is configured to provide data used to generate haptic responses to applications executing on the electronic device, that the electronic device should use a parametrically-defined haptic response to deliver a haptic response having the desired semantic attribute, selecting, by the haptics library, respective values for a set of haptic-response parameters; and providing instructions to cause haptic generators of the electronic device to deliver a parametrically-defined haptic response having the desired semantic attribute using the respective values for the set of haptic-response parameters.

20 Claims, 11 Drawing Sheets

(56) References Cited

U.S. PATENT DOCUMENTS

| | | |
|---|---|---|
| 10,133,351 B2 | 11/2018 | Weber et al. |
| 10,572,020 B2 | 2/2020 | Shah |
| 10,649,531 B2 | 5/2020 | Klein et al. |
| 2014/0125471 A1* | 5/2014 | Organ .................... G06F 3/016 |
| | | 340/407.2 |
| 2014/0267076 A1 | 9/2014 | Birnbaum et al. |
| 2015/0070149 A1* | 3/2015 | Cruz-Hernandez ...... G08B 6/00 |
| | | 340/407.1 |
| 2015/0199024 A1* | 7/2015 | Birnbaum ........ H04N 21/41407 |
| | | 715/702 |
| 2016/0085303 A1* | 3/2016 | Israr .................... H04N 21/485 |
| | | 340/407.2 |
| 2021/0389825 A1* | 12/2021 | Hamilton ................ G06F 3/017 |

\* cited by examiner

USING A HAPTIC EFFECTS LIBRARY TO DETERMINE WHETHER TO PROVIDE PREDEFINED OR PARAMETRICALLY-DEFINED HAPTIC RESPONSES, AND SYSTEMS AND METHODS OF USE THEREOF

CROSS-REFERENCE TO RELATED APPLICATIONS

This application claims priority to U.S. Prov. App. No. 63/333,528, filed on Apr. 21, 2022, and entitled "Haptic Effects Library and Methods of Use Thereof," which is incorporated herein by reference in its entirety.

TECHNICAL FIELD

This application relates generally to a haptic effects library and, more particularly, to the customization and scalability of haptic effects to different devices and applications by using a haptic effects library to determine whether (and, in some embodiments, when) to provide predefined or parametrically-defined haptic responses.

BACKGROUND

Conventional haptic effects are usually based on a finite number of predefined haptic effects that are specific to particular devices and/or particular applications. Changes or modifications to the predefined haptic effects can be limited, e.g., only allowing for changes to a measurable output of a haptic effect (e.g., changes in vibration strength). Further, because conventional haptic effects are based on a finite number of predefined haptic effects, storage of data associated with conventional haptic effects can take up a large amount of memory space in an electronic device and utilize large communication bandwidths to transfer haptic data (which can delay providing of a particular haptic effect to an end user). Additionally, conventional haptic effects can be device-specific, actuator-specific, and application-specific, such that data associated with a respective haptic effect is required for each instance.

As such, there is a need for haptic effect libraries that allow for the customization and dynamic application of haptic effects across a number of electronic devices and applications, as well as for designing haptic effect libraries with an ability to support more than just predefined haptic effects.

SUMMARY

To avoid one or more of the drawbacks or challenges discussed above, a haptic effects library that allows for the creation of expressive and customizable haptic effects is disclosed. The haptic effects library can be used to place haptic effects in any number of user applications and device-specific operations (e.g., vibrations, audio cues, illuminating indicators, etc.). In some embodiments, the haptic effects library allows for haptic effects to be triggered on-demand and/or associated with data streams (e.g., audio feeds, video feeds, application feeds, etc.) such that haptic effects are triggered in association with the data streams (e.g., vibrations or visual cues synchronized with a song track). Haptic effects generated by the haptic effects library can be defined and communicated parametrically, such that changes to the parameters result in systematic changes in the perceived quality (e.g., physical sensations, such as strength, speed, etc.) and semantic attributes (e.g., interpretable meanings, such as enthusiasm, urgency, etc.) of a haptic signal.

In some embodiments, the haptic effects library includes preset haptic effects as well as haptic functions associated with physical, perceptual, semantical, and custom user-defined input and output associations. In some embodiments, the haptic effects library has haptic effects associated with user interface (UI) control elements (also referred to herein as UI elements), instructional and notification messages, and haptic emojis (haptics that communicate emotion by providing a certain haptic effect to a user that then evokes an emotional response in a user that is associated with certain different types of emojis). In some embodiments, the haptic effect library adds haptic effects for dynamic and immersive interactions, as well as haptic effects for various data streams (audio, video, movement, etc.). The haptic effects library can be implemented on a computer, a server, a head-worn wearable device, a controller, a wrist-wearable device, a smartphone, a tablet, and other electronic devices. New haptic effects can be made, tuned, shared, broadcast, and stored in the haptic effects library. More specifically, the haptic effects library generates parametric-haptics changes to a haptics signal (or haptic waveform features, where the haptics signal and its underlying waveform features can be communicated to another device that is then able to generate a haptic effect using the haptics signal), physical feelings (strength, size, speed, etc.) delivered by a haptic generator receiving the haptic signal, and/or semantic interpretations of the haptics signal delivered to users via the haptic generator (e.g., emotional interpretation). The parametric-haptics changes allow the haptic effects library to generate close to an infinite number of haptic effects (e.g., via the tuning of one or more haptic functions). In some embodiments, the haptic effects library includes a number of UI tools that allow users to create, store, and channel (or distribute to) various haptic effects in applications and electronic devices. The haptic effects library provides the above-listed benefits while utilizing a small amount of storage space (e.g., at least less than half of the storage space required by conventional haptics libraries), utilizing low communication bandwidths minimizing latency, and minimizing the use of data in transferring haptic data.

Next, a few example aspects will be briefly summarized.

(A1) In accordance with some embodiments, a method of using a haptics library to determine whether to provide predefined haptic responses or parametrically-defined haptic responses is provided. The method includes receiving a first desired semantic attribute for a haptic response to be provided while a user is using a first application that is executing on an electronic device. The method includes, in accordance with a first determination, made by the haptics library that is distinct from the first application and that is configured to provide data used to generate haptic responses to a plurality of applications executing on the electronic device, that the electronic device should use a parametrically-defined haptic response instead of a predefined haptic response to deliver a haptic response having the first desired semantic attribute (a) selecting, by the haptics library and using a first function that takes at least the first desired semantic attribute as an input, respective values for a first set of haptic-response parameters; and (b) providing instructions to cause a haptic generator of the electronic device to deliver a first parametrically-defined haptic response having the first desired semantic attribute using the respective values for the first set of haptic-response parameters. For example, as described below in reference to FIGS. 2A and 2B, one or more tunables can be provided as input into one or more functions for generating a haptics response. The method further includes receiving a second desired semantic attribute, distinct from the first desired semantic attribute, for a haptic response to be provided while the user is using a second application that is executing on the electronic device. In accordance with a second determination, made by the haptics library, that the electronic device should use a second parametrically-defined haptic response instead of a predefined haptic response to deliver a haptic response having the second desired semantic attribute, the method includes (a) selecting, by the haptics library and using a second function that takes at least the second desired semantic attribute as an input, respective values for a second set of haptic-response parameters, the new respective values being distinct from the respective values; and (b) providing instructions to cause the haptic generator of the electronic device to deliver the second parametrically-defined haptic response having the second desired semantic attribute using the respective values for the second set of haptic-response parameters.

(A2) In some embodiments of A1, the method further includes receiving a third desired semantic attribute, distinct from the first desired semantic attribute and/or the second desired semantic attribute, for a haptic response to be provided while the user is using a third application that is executing on the electronic device. The method, in accordance with a third determination, made by the haptics library, that the electronic device should use a third parametrically-defined haptic response instead of a predefined haptic response to deliver a haptic response having the third desired semantic attribute (a) selecting, by the haptics library and using a third function that takes at least the third desired semantic attribute as an input, respective values for a third set of haptic-response parameters, the respective values for the third set of haptic-response parameters being distinct from the respective values and new respective values; and (b) providing instructions to cause the haptic generator of the electronic device to deliver a third parametrically-defined haptic response having the third desired semantic attribute using the respective values for the third set of haptic-response parameters.

(A3) In some embodiments of any of A1 and A2, the electronic device is a first electronic device, and the method further includes receiving a fourth desired semantic attribute for a haptic response to be provided while the user is using a fourth application that is executing at a second electronic device. The method, in accordance with a fourth determination, made by the haptics library, that the second electronic device should use a fourth parametrically-defined haptic response instead of a predefined haptic response to deliver a haptic response having the fourth desired semantic attribute (a) selecting, by the haptics library and using a fourth function that takes at least the fourth desired semantic attribute as an input, respective values for a fourth set of haptic-response parameters, the respective values for the fourth set of haptic-response parameters being distinct from the respective values and new respective values; and (b) providing instructions to cause a second haptic generator of the electronic device to deliver a fourth parametrically-defined haptic response having the fourth desired semantic attribute using the respective values for the fourth set of haptic-response parameters.

(A4) In some embodiments of any of sA1-A3, the haptics library is implemented in one or more of the cloud, a server, a laptop, a wearable device, a tablet, a phone, and a controller.

(A5) In some embodiments of any of A1-A4, the first desired semantic attribute and the second desired semantic attribute are determined based on a user input.

(A6) In some embodiments of A5, the user input is received at a user interface element displayed by the electronic device.

(A7) In some embodiments of A6, selecting, by the haptics library and using the second function that takes at least the second desired semantic attribute as the input includes receiving, via one or more user interface elements, one or more additional user inputs; and applying the one or more additional user inputs to the second function.

(A8) In some embodiments of A6, where the first function also takes as inputs a specific user interface element to which the user input was directed.

(A9) In some embodiments of any of A1-A8, the method further includes, in accordance with a determination, made by a haptics library that the first desired semantic attribute it outside a defined desired semantic attribute thresholds for the electronic device, providing a predefined haptic response; and providing instructions to cause the electronic device to deliver a first predefined haptic response having the first desired semantic attribute using the respective values for the first set of haptic-response parameters.

(A10) In some embodiments of A9, the predefined haptic responses are device-specific, application-specific, actuator-specific, user-interface-element-specific, and combinations thereof.

(A11) In some embodiments of any of A1-A10, the haptic-response parameters include two or more of: an amplitude, a frequency, a pulse rate, a signal envelope, duration, a signal extent/speed, or fundamental frequency.

(A12) In some embodiments of any of A1-A11, the semantic attributes include urgency, material properties, intensity, enthusiasm reflected in a haptic response.

(A13) In some embodiments of any of A1-A12, the first application, second application and third application are different application types.

(B1) In accordance with some embodiments, a wrist-wearable device including a haptics library for determining whether to provide predefined haptic responses or parametrically-defined haptic responses is provided. The wrist-wearable device is configured to perform or cause performance of the method of any of A1-A13.

(C1) A wrist-wearable device including a haptics library for determining whether to provide predefined haptic responses or parametrically-defined haptic responses is provided. The wrist-wearable device includes means for performing or causing performance of the method of any of A1-A13.

(D1) An electronic device (e.g., a head-worn wearable device, a smartphone, a gaming console, a gaming controller, and other electronic devices capable of providing haptic effects directly and/or communicating information used by a another device to generate haptic effects) including (or associated with/configured to receive instructions provided by way of) a haptics library for determining whether to provide predefined haptic responses or parametrically-defined haptic responses is provided. The electronic device is configured to perform or cause performance of the method of any of A1-A13.

(E1) An electronic device (e.g., a head-worn wearable device, a smartphone, a gaming console, a gaming controller, and other electronic devices capable of providing haptic effects directly and/or communicating information used by another device to generate haptic effects) including (or associated with/configured to receive instructions provided by way of) a haptics library for determining whether to provide predefined haptic responses or parametrically-defined haptic responses is provided. The electronic device includes means for performing or causing performance of the method of any of A1-A13.

(F1) A non-transitory, computer-readable storage medium including instructions that, when executed by an electronic device (e.g., a head-worn wearable device, a smartphone, a gaming console, a gaming controller, and other electronic devices capable of providing haptic effects directly and/or communicating information used by another device to generate haptic effects), cause the wrist-wearable device to perform or cause performance of the method of any of A1-A13.

Note that the various embodiments described above can be combined with other embodiments described herein (e.g., keeping an impedance for a single or group of neuromuscular-signal sensors can be combined with matching of impedances, such that impedances can be both matched and be kept within particular ranges of impedance values). The features and advantages described in the specification are not all inclusive and, in particular, additional features and advantages will be apparent to one of ordinary skill in the art in view of the drawings, specification, and claims. Moreover, it should be noted that the language used in the specification has been principally selected for readability and instructional purposes.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. The description may admit to other effective features as the person of skill in this art will appreciate upon reading this disclosure.

Figure 1A:
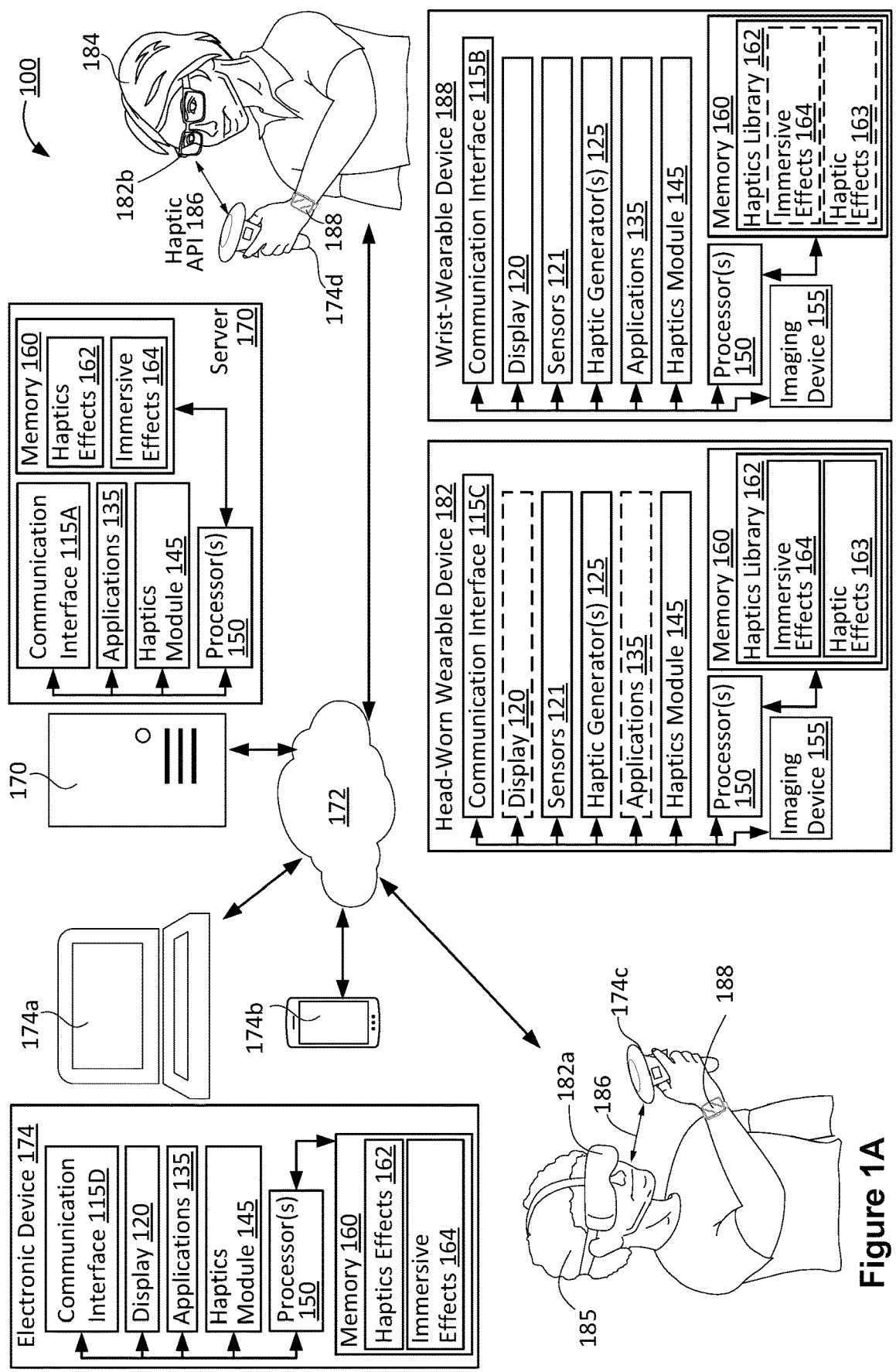
FIG. 1A illustrates a system of one or more devices using a haptic effects library (e.g., haptics library 162 shown for the example devices, each of a different type, 174, 170, 182, and 188 in FIG. 1A) to determine whether to provide predefined haptic responses or parametrically-defined haptic responses, in accordance with some embodiments.

In accordance with common practice, the various features illustrated in the drawings are not drawn to scale. Accordingly, the dimensions of the various features may be arbitrarily expanded or reduced for clarity. In addition, some of the drawings may not depict all of the components of a given system, method, or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

FIG. 1A illustrates a system 100 of one or more devices using a haptic effects library to determine whether to provide predefined haptic responses or parametrically-defined haptic responses, in accordance with some embodiments. The haptic effects library (e.g., haptics module 145) can be used for dynamically creating expressive and customizable haptic responses (also referred to as haptic signals) for a user (e.g., first and second users 184 and 185) based on user input, applications running on an electronic device (e.g., a computer, 174a, a smartphone 174b, a controller 174c, a head-worn wearable device 182, a wrist-wearable device 188, etc.), device capabilities, device settings, and/or other factors. The system 100 can include one or more of servers 170, electronic devices 174, head-worn wearable devices 182, and/or wrist-wearable devices 188. In some embodiments, the one or more of servers 170, electronic devices 174, head-worn wearable devices 182, and/or wrist-wearable devices 188 are communicatively coupled via a network 172. The haptic effects library can be implemented in one or more devices, such as the one or more of servers 170, electronic devices 174, head-worn wearable devices 182, and/or wrist-wearable devices 188; alternatively, or in addition, the haptic effects library can be a shared resource that an electronic device accesses through another device, e.g., wrist-wearable device 188, in some embodiments, does not include its own haptics library 162, but instead, obtains data used to generate haptic effects through another device such as electronic device 174 or server 170. In some embodiments, the one or more devices perform operations based on data generated using the haptic effects library, using one or more respective processors, individually or in conjunction with at least one other device as described herein. More specifically, the Haptics Library 162 is a data structure that is used to provide haptic signaling data and/or waveforms to other devices that then provide the haptic effects to an end user. The one or more devices are described in turn below.

In some embodiments, the wrist-wearable device 188 includes one or more components such as a communication interface 115B (referred to generally as communication interface 115), a display 120, one or more sensors 121, one or more haptic generators 125, one or more applications 135, a haptics module 145, one or more imaging devices 155 (e.g., a camera), one or more processors 150, and memory 160. In some embodiments, the memory 160 is configured to store a haptics library 162 including one or more immersive effects 164 and one or more haptic effects 163. Although not show, in some embodiments, the memory 160 can include application data, device data (e.g., device hardware, device model, etc.), image data, sensor data, and/or user data (e.g., data collected through use of a device, data collected through use of an application, user preferences, or other information stored by the user). In some embodiments, the one or more components of the wrist-wearable device 188 are housed within a capsule (or watch body) and/or a band if the wrist-wearable device 188.

In some embodiments, the communications interface 115 is configured to communicatively couple the wrist-wearable device 188 to one or more other devices such as the head-worn wearable device 182, electronic device 174 (e.g., a computer 174a, a smartphone 174b, a controller 174c, a tablet, etc.), and/or one or more servers 170. The communication interface 115 is used establish wired or wireless connections between the wrist-wearable device 188 and the other devices, and, in some embodiments or circumstances, the communication interfaces 115 can be used to convey data used to generate haptic effects between devices (e.g., data generated at electronic device 174 using haptic effects 162 and immersive effects 164 from memory 160, which electronic device 174 can be a gaming console in one example, that is then provided to one or both of the devices 182 and 188 (and/or to a controller 174c or 174d) for providing a desired haptic effect to an end user 185 or 184). In some embodiments, the communication interface 115 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol.

In some embodiments, the display 120 is configured to present information to a user (e.g., first and second users 184 and 185), such as one or more user interfaces, messages, notifications (e.g., alerts, alarms, etc.), images, and video. In some embodiments, the display 120 is a touch display configured to receive one or more inputs from the user.

The one or more sensors 121 can include heart rate sensors, electromyography (EMG) sensors, SpO2 sensors, altimeters. Non-limiting examples of the one or more sensors 121 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 121 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 121 can include location sensing devices (e.g., GPS) configured to provide location information to the processors 150 and that location information can be displayed via display 120 on the wrist-wearable device 188. In some embodiment, the data measured or sensed by the one or more sensors 121 is stored in memory 160. In some embodiments, the sensor data is used by the haptics module 145 for generating one or more haptic responses as discussed below.

The one or more haptic generators 125 can include one or more actuators (e.g., eccentric rotating mass (ERM), linear resonant actuators (LRA), voice coil motor (VCM), piezo haptic actuator, thermoelectric devices, solenoid actuators, ultrasonic transducers, or sensors, etc.). In some embodiments, the one or more haptic generators 125 include hydraulic, pneumatic, electric, and/or mechanical actuators.

In some embodiments, the one or more haptic generators 125 are part of a surface of the wrist-wearable device 188 that can be used to generate a haptic response (e.g., a thermal change at the surface, a tightening or loosening of a band, increase or decrease in pressure, etc.). For example, the one or more haptic generators 125 can apply vibration stimulations, pressure stimulations, squeeze simulations, shear stimulations, temperature changes, or some combination thereof to the user. In addition, in some embodiments, the one or more haptic generators 125 include audio generating devices (e.g., speakers and other sound transducers) and illuminating devices (e.g., light-emitting diodes (LED)s, screen displays, etc.). The one or more haptic generators 125 can be used to generate different audible sounds and/or visible lights that are provided to the user as haptic responses (generated by the haptics module 145 based on a set of haptic-response parameters as described below). The above list of haptic generators is non-exhaustive; any affective devices can be used to generate one or more haptic responses that are delivered to a user.

In some embodiments, the one or more imaging devices 155 can include an ultra-wide camera, a wide camera, a telephoto camera, a depth-sensing cameras, or other types of cameras. In some embodiments, the one or more imaging devices 155 are used to capture image data and/or video data via the wrist-wearable device 188. The captured image data can be processed and stored in memory and then presented to a user for viewing. The one or more imaging devices 155 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 155 is stored in memory 160 (which can include volatile and non-volatile memory such that the image data and/or video data can be temporarily or permanently stored, as needed depending on the circumstances).

In some embodiments, the one or more applications 135 include social-media applications, banking applications, health applications, messaging applications, web browsers, gaming application, streaming applications, media applications, imaging applications, productivity applications, social applications, etc. In some embodiments, the one or more applications 135 include artificial reality applications, which include, but are not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments. In some embodiments, the media content is based on received information from one or more applications 135 (e.g., productivity applications, social applications, games, etc.). The one or more applications 135 can be configured to be displayed on the wrist-wearable device 188. In some embodiments, the one or more applications 135 are associated with one or more haptic responses that, when generated by the one or more haptic generators 125, improve a user's experience (e.g., by simulating expected responses, providing immersive effects, providing notifications or other customizable triggers, and/or otherwise convey sensory information from a device to a user). As discussed below, the haptic responses can be generated by the haptics module 145.

In some embodiments, the haptics module 145 is configured dynamically generate haptic responses at the wrist-wearable device 188 which are delivered to a user via the one or more haptic generators 125. In particular, the haptics module 145 utilizes information received from the one or more applications 135, sensor data measured by the one or more sensors 121, and/or user inputs received via the wrist-wearable device 188 or from other devices communicatively coupled to the wrist-wearable device 188 to generate haptic responses (also referred to as parametrically-defined haptic responses). The generated haptic responses include parametrically-defined haptics that change waveform features based on contextual inputs to account, e.g., for desired haptic effects to be felt by an end user (strength, size, speed, etc. of a haptic effect) and/or semantic interpretations of a haptic signal (e.g., a way in which a user perceives the haptic effective semantically). In some embodiments, the generated haptic responses are provided by making use of tunable perceptual parameters and tunable semantic parameters (which can be configured using user interfaces associated with creating and maintain a haptic effects library, such as those described with reference to FIGS. 3A-3B below). Examples of tunable functions include physical functions, such as trapezoid, attack decay sustain release (ADSR), attack sustain release (ASR), brake vibrations that simulate the intervention of the anti-lock braking system (ABS), clamp, shear, etc.; perceptual functions, such as button press envelopes (e.g., haptic responses that simulate actuation of a button or customize actuation of a button press (e.g., grainy to smooth actuation), elasticity (e.g., adjustments to force required to actuate a button, move a component of the device (e.g., a thumbstick), squeezing pressure, etc.), etc.; and semantic functions, such as urgency (e.g., low urgency to high urgency), completion or success (e.g., different response based on successful completion of an action or failure of an action), etc. Additionally, in some embodiments, the tunable functions are defined by user inputs, user desired outputs, and/or association with specific functions.

The one or more processors 150 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 160. The memory 160 may be or include random access memory (RAM), read-only memory (ROM), dynamic random-access memory (DRAM), static random-access memory (SRAM) and magnetoresistive random access memory (MRAM), and may include firmware, such as static data or fixed instructions, basic input/output system (BIOS), system functions, configuration data, and other routines used during the operation of the wrist-wearable device 188 and the processor 150. The memory 160 also provides a storage area for data and instructions associated with applications and data handled by the processor 150.

In some embodiments, the memory 160 stores at least the haptic library 162 (one or more predefined haptics or functions for generating customizable or parametrically-defined haptics). The haptics library 162 requires minimal storage space (e.g., less than at least half of the storage space required by conventional haptics libraries, such that in some instances total memory used for storing the haptics library 162 is less than 200 MB and, more preferably, less than 50 MB). In some embodiments, the haptics library includes immersive effects 164 and/or haptic effects 163. As discussed below in reference to FIGS. 1B-1D, immersive effects 164 and haptic effects 163 include one or more tunable functions used to generate customizable functions that provide perceptual and/or semantic haptics to the user. Immersive effects 164 include library-definable haptics (e.g., customizable by a user or application developer) and predefined haptics (that can be provided to the user when customizable haptics are not available or configured for use) configured to engage the user in an application 135 or action performed on the wrist-wearable device 188 (when respective haptic responses are provided to a haptic generator 125). Haptic effects 163 include a library of definable haptics and predefined haptics that are configured to enhance or improve user interaction with different user interfaces of the wrist-wearable device 188. In addition, haptic effects 163 can include stored customized haptic responses previously defined and stored by the user. More specifically, the haptic effects 163 can include parametric-haptic changes defined by the user. In some embodiments, haptic effects 163 includes haptics defined for typical user interface categories for extended reality (XR) interactions, created by a user using systematic rules. The haptic effects 163 (e.g., tunable and predefined haptics for interaction with typical user interfaces) and the immersive effects 164 (e.g., tunable and predefined haptics for engaging the user in an application 135 or action performed at a device) are discussed below in reference to FIGS. 1B-1D.

In some embodiments, the haptics library 162 can be a library of effects for UI categories for artificial-reality (e.g., extended-reality interactions. In some embodiments, predefined haptic responses can be defined by a user application such as a messaging application (e.g., WhatsApp). In some embodiments, predefined haptic responses can be placed into four different categories: social, status, instructional, and/or UI element. In some embodiments, predefined haptic responses are not customized based on context, e.g., an emoji received from your boss results in a different haptic response than that same emoji received from your best friend, a high urgency or low urgency response, etc. In some embodiments, parametrically-defined haptic responses can provide user customization by offering tunable effects in the aforementioned four categories, along with a user-control panel for implementation in PC, MAC, virtual reality, device, web, wristbands, touch controllers, and gaming (in-app UI and control panel). In some embodiments, parametrically-defined haptic effects can change the waveform features as well as feelings experienced by a user of a wearable device. While predefined haptic effects are finite, parametrically-defined haptic responses can be tuned, leading to a near-infinite amount of possible haptic responses.

In some embodiments, predefined haptic responses can be provided as a same haptic response, regardless of additional context, such as when a vibration-based feedback (e.g., one type of a haptic response) is provided. In these embodiments, parametrically-defined haptic responses can be provided in accordance with a function that can be pulled from (or generated by) a haptics library, such as a function that can be used to produce haptic effects that are context-dependent/parametrically-defined (defined by different parameters to take context into account in producing a desired haptic response) with one example being that a haptic response associated with receipt of an emoji from a friend can produce (by the function) a first type of haptic response, while a haptic response associated with receipt of that same emoji from an unknown contact can produce a different (e.g., softened) haptic response.

Further, the haptics library 162 is scalable to other actuator types and electronic device form factors. In some embodiments, the haptics library 162 can include data that defines haptic responses for each device such that the haptic generators of the device are capable of delivering a haptic response, and if a haptic response cannot be defined such that is within the haptic generator's capabilities (or a haptic generator is unavailable), a predetermined haptic response is used. Additional information on example haptics libraries is provided below in reference to FIGS. 1B-2B.

The head-worn wearable device 182 can include a communication interface 115C, one or more sensors 121, one or more haptic generators 125, a haptics module 145, one or more imaging devices 155 (e.g., a camera), one or more processors 150, and memory 160. In some embodiments, the head-worn wearable device 182 includes a display 120 and/or one or more applications 135. In some embodiments, the head-worn wearable device 182 are smart glasses 182b (e.g., the augmented-reality glasses), artificial reality headset (e.g., VR/AR headset 182a), or other head worn device. In some embodiments, the head-worn wearable device 182 operates in conjunction with the wrist-wearable device 188 (or other devices (e.g., electronic device 174)) via a haptic API 186. Similar to the wrist-wearable device 188, the head-worn wearable device 182 can use the one or more haptic generators 125 and the haptics module 145 to generate different haptic effects for a user.

Electronic devices 174 can also include a communication interface 115D, a display 120, one or more sensors 121, one or more haptic generators 125, one or more applications 135, a haptics module 145, one or more imaging devices 155 (e.g., a camera), one or more processors 150, and memory 160. The one or more haptic generators 125 and the haptics module 145 of the respective electronic devices 174 can be used to generate different haptic effects for a user similar to the wrist-wearable device 188. In some embodiments, an electronic device 174 operate in conjunction with the wrist-wearable device 188, the head-worn wearable device 182, or other devices via a haptic API 186.

Server 170 includes a communication interface 115A, one or more applications 135, a haptics module 145, one or more processors 150, and memory 160. In some embodiments, the server 170 generates different haptic responses using the haptics module 145 and provides the generated haptic responses to one or more of the wrist-wearable device 188, the head-worn wearable device 182, and the electronic devices 174.

Figure 1B:
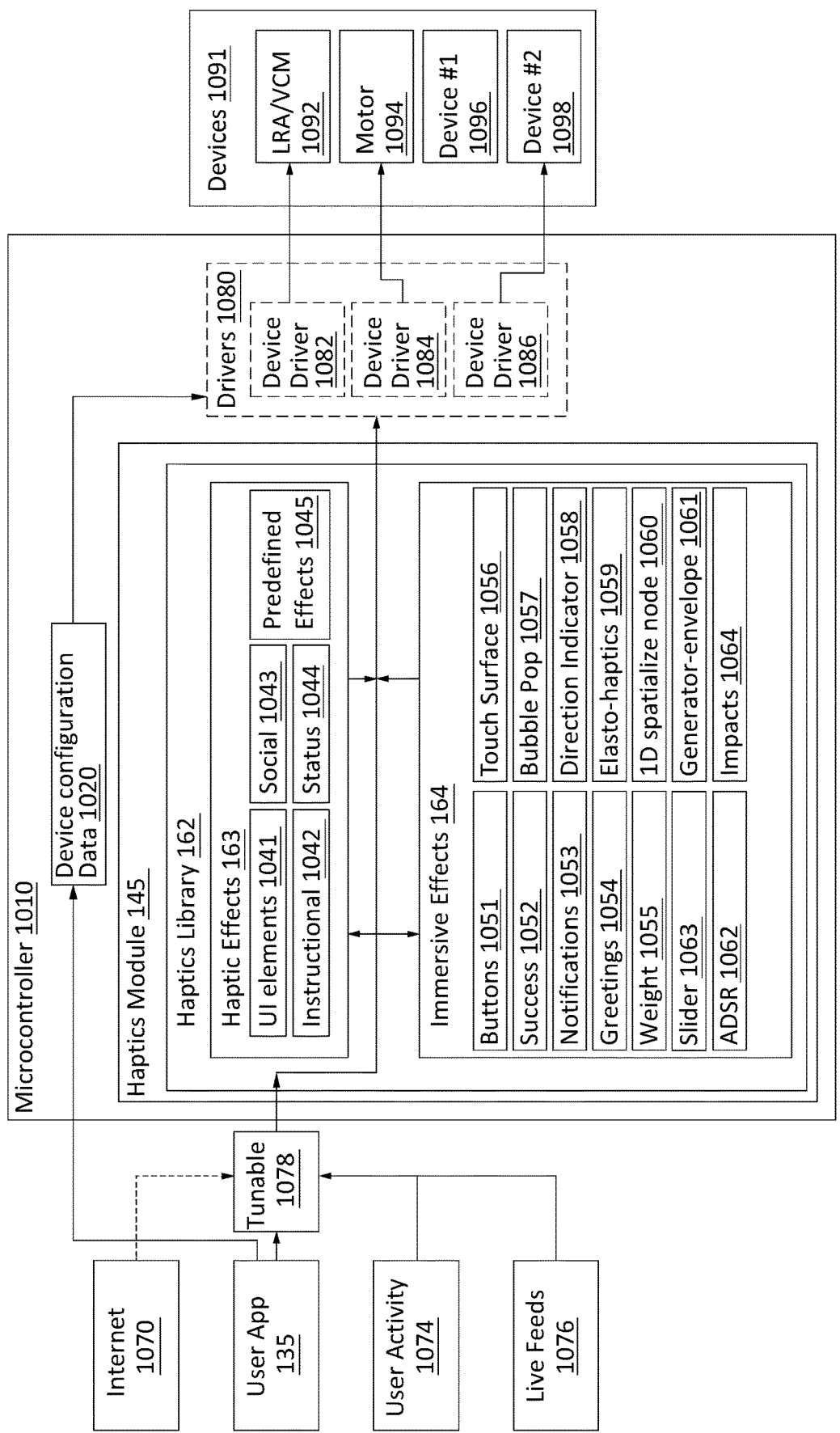
FIGS. 1B-1D illustrate example implementations of the haptic effects library on different devices, in accordance with some embodiments.

Having thus described FIG. 1A, attention is now directed to FIG. 1B. FIG. 1B illustrates a haptics module 145 implemented on a microcontroller, in accordance with some embodiments. The microcontroller 1010 can be an instance of a processor 150 (e.g., with an integrated or communicatively coupled memory 160) of a user device, such as a wrist-wearable device 188, a head-worn wearable device 182, and/or an electronic device 174, which were described above in reference to FIG. 1A. The microcontroller 1010 includes device configuration data 1020, which includes hardware, firmware, and/or other device specific information. The microcontroller 1010 includes one or more device drivers 1080 for operating one or more devices 1091 that are part of the user device or communicatively coupled to the user device (e.g., haptic generators 125 (FIG. 1A), controllers, and/or, other user devices). The microcontroller 1010 includes a haptic module 145 with a haptics library 162 for generating data to cause one or more haptic responses such that the data, when provided to the one or more devices 1091, cause the one or more devices 1091 to produce or deliver respective haptic responses. In some embodiments, the haptic module 145 receives perceptual and semantic parameters (or "tunables" 1078) that are used to customize the one or more haptic responses. More specifically, the haptics module 145 can select one or more values for a set of haptic-response parameters based on, at least, the tunables 1078 that are used with a haptic function to generate the haptic response as discussed in detail below in reference to FIGS. 2A and 2B. In some embodiments, the tunables 1078 are received from the internet 1070, one or more user applications 135, user activity 1074 (recent or over a period of time) on the device including the microcontroller 1010, and one or more live feeds 1076 (e.g., audio data, video data, and/or other data received in real-time).

The device configuration data 1020 can include user-defined settings for the user device. The microcontroller 1010 utilizes the device configuration data 1020 in conjunction with the haptic responses generated by the haptics module 145 to provide instructions to the one or more device drivers 1080 for operating the one or more devices 1091 or causing the one or more devices 1091 to deliver a haptics response to a user. For example, the device configuration data 1020 can identify one or more haptic generators 125 that are available, and then provide data to cause presentation of certain haptic responses and instructions to respective device drivers of the available haptic generators 125 (e.g., a first device driver 1082 and LRA/VCM 190 and/or a second device driver 1084 and motor 1094) to cause respective haptic response to be delivered to the user. Similarly, the device configuration data 1020 can identify one or more devices communicatively coupled to the user device and provide data associated with respective haptic responses to respective device drivers of the communicatively coupled devices (e.g., a third device driver 1086 and device #2 1098) to cause respective haptic responses to be delivered to the user. The one or more devices 1091 communicatively coupled to the user device can include controllers (e.g., gamepads, keyboards, touch screen controllers, etc.), audio devices (e.g., speakers, headphones, etc.), wearable devices (e.g., headbands, hats, wristbands, gloves, etc.), and/or other user devices described above in FIG. 1A.

The haptics library 162 includes haptic effects 163 and immersive effects 164. Haptic effects 163 are tunable and predefined haptics for typical user interface (UI) categories for artificial-reality (e.g., extended-reality/XR as one example) interactions. For example, haptic effects 163 can include tunable functions for haptics associated with UI elements 1041 (e.g., data to cause generation of haptic responses associated with selection of a UI element), instructional 1042 (e.g., data to cause generation of haptic responses associated with providing instructions or directing a user, such as turning left, right, moving forward, etc.), social haptics 1043 (e.g., data to cause generation of haptic responses associated with interactions with social applications, such as messaging applications, image sharing applications, etc.), status haptics 1044 (e.g., data to cause generation of haptic responses for user status, application status, or device status, such as successful completion of tasks, alarms, notifications, system errors, etc.), and predefined effects 1045 (e.g., data to cause generation of predefined haptic responses for particular electronic devices and/or applications).

Immersive effects 164 are tunable and predefined haptics for engaging the user in an application 135 or action performed at a device including the microcontroller 1010. For example, immersive effects 164 can include tunable functions for button haptics 1051 (e.g., haptics that simulate a button press or customized haptics that are performed when a button is pressed), success haptics 1052 (e.g., customized haptics that are performed at successful completion of an activity or action performed at a device), notification haptics 1053 (e.g., customized haptics that are performed when a notification is generated by the device or an application running on the device), greetings haptics 1054 (e.g., customized haptics that are performed when the device is activated (e.g., first turned on or woken up), touch surface haptics 1056 (e.g., customized haptics that are performed when a surface of a device is touched, such as contact on a touch screen, sensors on a controller surface, etc.), bubble pop haptics 1057 (e.g., simulated bubble pops in an application of a device), directional indicator haptics 1058 (e.g., haptics that direct a user of the device in a particular direction (e.g., within an application, such as a gaming application, or in real life (through a navigation application)), and elasto-haptics 1059 (e.g., haptics that simulate elasticity, such as compression or loosing of a surface (e.g., wristband); springiness (e.g., return of a button or thumbstick to a rest position when actuated). Additional immersive effects 164 can include weight haptics 1055 (e.g., haptics that simulate weight), slider haptics 1063 (e.g., customized haptics that are performed when a physical slider of the device or a UI element slider provided by the device is adjusted), ASDR haptics 1062 (e.g., audio-haptics envelopes used to generate audible sounds), impact haptics 1064 (e.g., haptics that simulate collision or impact with one or more objects or surfaces, such as contacting or hitting an object within a game application). Immersive effects 164 can also include models for generating haptic responses, such as 1D specialize node haptics 1060 and generator-envelopes 1061.

The different haptic effects 163 and immersive effects 164 described above are non-limiting examples. Different haptic effect functions can be included in the haptic effects 163 and immersive effects 164 that allow for customization of the generated haptic responses.

The haptic responses generated by the haptics module 145 are provided to the drivers 1080. The drivers 1080 include device drivers 1082, 1084, and 1086, which are used to communicate and/or instruct the one or more devices 1091 to perform one or more operations. For example, a first device driver 1082 is configured to cause LRA/VCM actuators 1092 to deliver a haptic response to a user in accordance with data to produce a first haptic response. A second device driver 1084 is configured to cause a motor 1094 to deliver a haptic response to a user in accordance with data to produce a second haptic response, and a third driver 1086 is configured to cause device #2 1098 to deliver a haptic response to a user in accordance with data to produce a third haptic response.

Figure 1C:
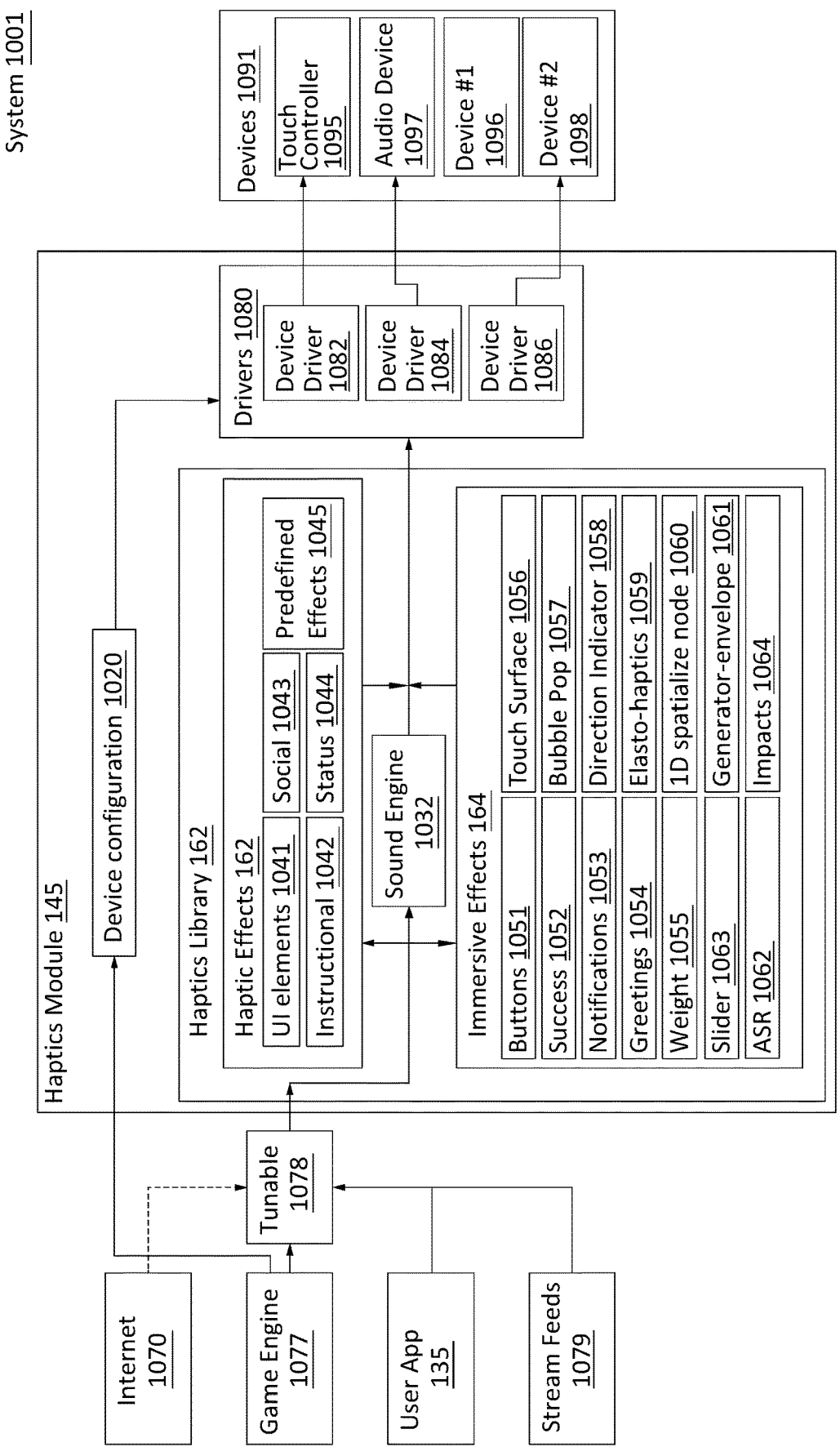

As a skilled artisan will understand upon reading this disclosure, haptic responses/effects are generated based on underlying data to control associated haptic drives (e.g., drivers 1080, FIG. 1C) and/or devices 1091 (e.g., devices 1091, FIG. 1C). This underlying data can be directly stored in haptics library 162 for certain haptic effects, and the underlying data can be something that is generated on-the-fly based on use a specified function to produce a context-dependent or parametrically-defined haptic response, such that rather than directly storing waveforms or other information used to instruct the drivers 1080, the haptics library 162 can also store a plurality of different functions used to take in various parameters (e.g., from game engine 1077, user app 135, stream feeds 1079, among others) to produce data that is then used to instruct the drivers 1080 and other components to deliver a desired haptic response/effect.

Turning now to FIG. 1C, illustrated there is an implementation of the haptic effects library on a device, in accordance with some embodiments. In particular, FIG. 1B illustrates a modular microcontroller than can be retrofitted or used to upgrade an existing device and FIG. 1C illustrates a haptics library 162 that can be added to a device via software or firmware updates. A system 1001 can include a haptics module 145 stored in memory of a user device or computer-readable storage medium of a user device (e.g., a wrist-wearable device 188, a head-worn wearable device 182, and/or an electronic device 174 described above in reference to FIG. 1A). Operations of the haptics module 145 can be performed by one or more processors 150 (FIG. 1A). In some embodiments, the haptics module 145 includes device configuration data 1020 and one or more device drivers 1080. As described above in reference to FIG. 1B, the device configuration data 1020 includes hardware, firmware, and/or other device specific information and the one or more devices 1091 communicatively coupled to the user device can include controllers (e.g., touch controllers 1095), audio devices 1097, wearable devices, and/or other user devices described above in FIG. 1A.

As described above in reference to FIG. 1B, in some embodiments, the haptic module 145 receives tunables 1078 that are used to customize the one or more haptic responses. In some embodiments, in addition to the sources described above, tunables 1078 can be received from a game engine 1077 (e.g., software framework designed for the development of video games) and/or stream feeds 1079 (e.g., streamed content (e.g., audio and/or video data) received at the user device). For example, in some embodiments, one or more tunables 1078 for customizing a haptic response can be generated based on audible sounds produced by a user device. In some embodiments, the haptics module also receives information from physics engines, world data, triggers, application events, Wi-Fi, and/or wireless feeds.

In some embodiments, the haptics module 145 includes a sound engine 1032 for generating one or more sound profiles or functions that, when provided to an audio device, cause the audio device to generate an audible sound. System 1001 is configured to perform similar operations to those described above in reference to FIG. 1B.

Figure 1D:
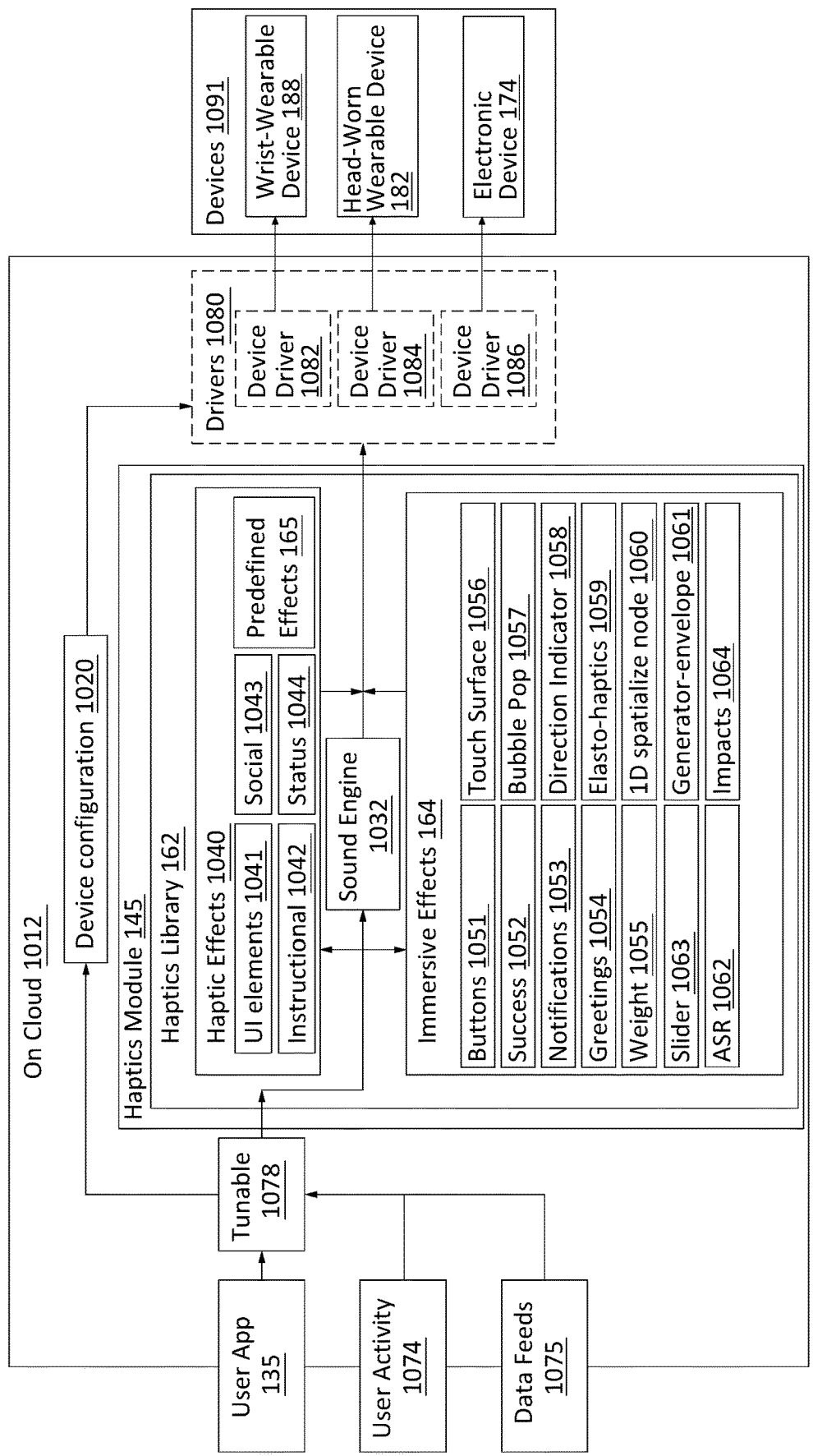

FIG. 1D illustrates implementation of the haptic effects library at a cloud server, in accordance with some embodiments. More specifically, FIG. 1D illustrates a server 170 including haptics module 145. FIG. 1D illustrates that the haptics library 162 does not need to be installed or included at an individual user device. In some embodiments, data to cause one or more haptic responses to be performed can be generated remotely and provided to an end user device. In this way, user devices do not need to utilize any memory or processing resources to store and generate different haptic responses. Further, older devices that may not satisfy the baseline hardware and/or software requirements, can utilize the server 170 to cause the performance of the generated haptic responses described herein. In some embodiments, server 170 includes one or more components and performs one or more operations as described above in reference to FIGS. 1A-1C. For example, server 170 can receive tunables 1078 from user applications 135, user activity 1074 (including user data), and data feeds 1075 (e.g., audio data, video data, and any data from one or more sensors 121 (FIG. 1A), as well as ongoing operations or tasks at a device (e.g., electronic device 174, head-worn wearable device 182, wrist-wearable device 188, etc.)) that are used, by the haptics module 145, to customize one or more haptic responses as described above. The haptic responses generated by the haptics module 145 are provided to one or more devices 1091, such as a wrist-wearable device 188, head-worn wearable device 182, electronic device 174, or other devices described above.

The haptics module 145 allows for the generation of any number of customizable haptic responses for user applications. In some embodiments, haptic responses can be triggered on demand or associated with data streams by pre-scribed functions as discussed below in reference to FIGS. 2A and 2B. In some embodiments, the haptics module 145 does not use predefined haptic effects to generate one or more haptic responses. As discussed below in reference to FIGS. 2A and 2B, the haptics module 145 uses one or more functions to generate a haptic response (e.g., for an action (e.g., a button click), an event (e.g., a notification), and/or any other immersive experience (e.g., playing a game)). For example, in some embodiments, as a hand motion changes, a haptics response generated by the haptics module 145 can be changed based on the prescribed functions that are used define the haptic response along with a change in the motion data collected by the one or more sensors 121 (FIG. 1A) tracking a user's hand motion.

Figure 2A:
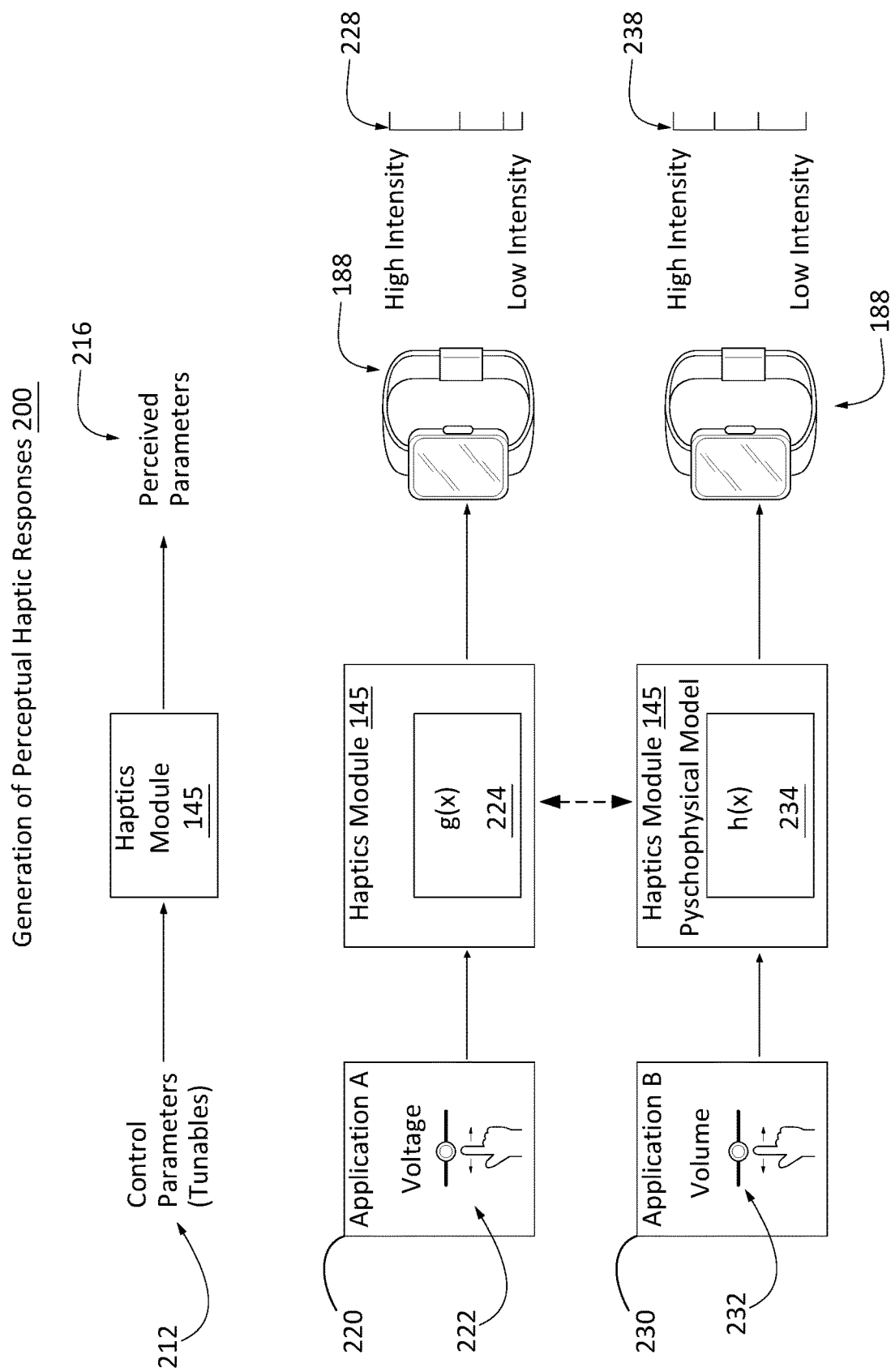
FIGS. 2A and 2B illustrate generation of one or more haptic responses based on parametric values, in accordance with some embodiments.
Figure 2B:
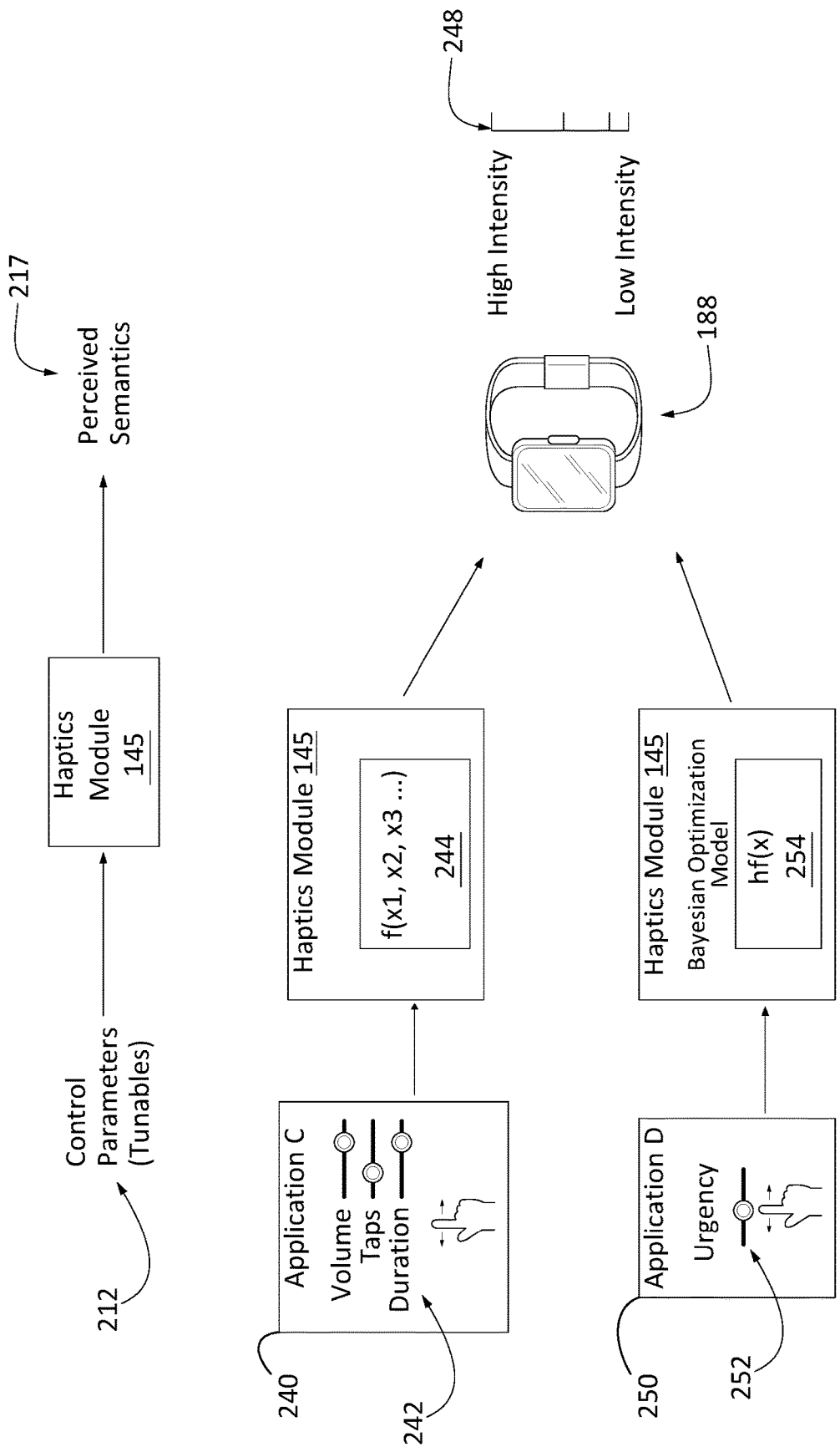

Turning next to FIGS. 2A and 2B, illustrated there is generation of one or more haptic responses based on parametric values, in accordance with some embodiments. One or more parameters of a haptic response can be adjusted to change characteristic features used to produce the haptic response, including, e.g., waveform features of the parametrically-defined haptic response, change perceptual characteristics (strength, size, speed, etc.) experienced by a user when the parametrically-defined haptic response is delivered to the user (e.g., via a wearable device), and semantic interpretation of the haptic response when the parametrically-defined haptic response is delivered to the user. A perceptual haptic response, as shown in FIG. 2A, is a haptic response that is associated with physical properties of a haptic response delivered to the user (e.g., vibration on the use's skin). A semantic haptic response, as shown in FIG. 2B, is a haptic response that is associated with an interpretable significance that the haptic response aims to convey to the user (e.g., a feeling of urgency based on the frequency, intensity, duration, etc. of a vibration on the use's skin, a feeling of joy, enthusiasm, etc.).

As described above, in some embodiments, haptic responses are defined and communicated parametrically, where a change in parameters results in systematic changes in the perceived quality of the haptic responses (as well as semantic attributes as described below in reference to FIG. 2B). Perceived qualities of a haptic response can include a perceived (or sensed) attribute of a haptic response, such as a size, a strength, a speed, a duration, etc. of the haptic response delivered to a user. FIG. 2A shows changes in perceived qualities of a haptic response based one or more tunables. More specifically, in FIG. 2A, one or more tunables are used to generate perceptual haptic responses 200. For example, control parameters (or tunables) 212 are provided to a haptics module 145. The haptics module 145 uses the control parameters 212 to determine perceived parameters 216 for a perceptual haptic response. In some embodiments, the perceived parameters 216 are determined based on the use of one or more functions described above in reference to FIG. 1A.

In some embodiments, control parameters 212 are provided through an application. For example, Application A 220 can provide the haptics module 145 with a control parameter 212 (e.g., such as a change in voltage 222) that is used to determine perceived parameters for a haptic response for intensity (e.g., intensity distribution plot 228), where the haptic response for intensity is used for determining an intensity of a haptic response (e.g., vibration, sound, etc.) to be delivered to a user via a wrist-wearable device 188 (when a haptic response is delivered to a user by one or more haptic generators 125, which haptic generators 125 were shown FIG. 1A). The haptic response for intensity (or any other perceptual haptic response) can have a plurality of levels (e.g., high, medium, or low intensity). The control parameters 212 can be changed by the user or the developer of the application (e.g., at the time of an application update). The control parameters are provided to one or more functions (represented by g(x) 224) to determine the haptic response for intensity.

The respective haptic response can be a change in vibration intensity, which can result in different vibrations to be generated at different points in time; a change in volume intensity, which can result in different sound levels to be used at different points in time; a change in actuation (e.g., button press) sensation, which can result in different vibrations to be generated at different points in time or different actuation forces to be used at different points in time; and a change in elasticity, which can result in a change in resistive force (e.g., at a thumbstick or button) and/or the amount of pressure applied by a device (e.g., band of the wrist-wearable device 188 squeezing on a user's wrist). The above examples are non-limiting. Different haptic response can be generated based on the haptic generators 125 available at a device.

In some embodiments, a perceptual haptic response determined for a first application can be used to determine a perceptual haptic response for another application. For example, the haptic response for intensity generated for Application A 220 can be used to determine a haptic response for Application B 230. In some embodiments, a generalized haptic response can be associated with a psychophysical attribute. For example, the haptics module 145 can apply a psychophysical model (e.g., h(x) 234) to determine the psychophysical haptic response for another application (e.g., Application B 230). In FIG. 2A, the haptic response for intensity generated for Application A 220 is based on voltage, and the haptics module 145 determines a psychophysical haptic response (e.g., volume intensity plot 238) for Application B 230 based on the haptic response for intensity generated for Application A 220. By applying a psychophysical model, the haptics module 145 is able to convert an abstract value, such as voltage, to an understandable parameter, such as volume.

Changes to control parameters in a determined psychophysical haptic response can be used to further define or adjust the psychophysical haptic response. For example, Application B 230 can provide the haptics module 145 additional control parameters 212 (e.g., such as a change in volume 232) that is used to determine perceived parameters for the psychophysical haptic response (e.g., volume intensity plot 238), where the psychophysical haptic response is used for determining a sound level for a sound delivered to a user via the wrist-wearable device 188 (e.g., one or more haptic generators of the wrist-wearable device 188).

Turning now to FIG. 2B, one or more tunables shown as being used, by the haptics module 145, to generate semantic haptic responses 201. Sematic haptic responses 201 are defined and communicated parametrically, where a change in parameters results in systematic changes in semantic attributes of the haptic responses (as well as perceived qualities as described above in FIG. 2A). Semantic attributes of a haptic response can include messages or information that the haptic response aims to convey to a user, such as urgency, emotions (e.g., happiness in a song, fear in a horror game, etc.), success, failure, enthusiasm, etc. For example, in a health application, when a user is running, the semantic haptic response delivered to a user via a haptic generator can communicate success or an achievement to the user (e.g., "good job" reflected in a delivered haptic response). Similar to the generation of perceptual haptic responses 200, control parameters (or tunables) 212 are provided to a haptics module 145 for the generation of the semantic haptic responses 201. The haptics module 145 uses the control parameters 212 to determine perceived semantics 217 for a haptic response. In some embodiments, the perceived semantics 217 are determined based on the use of one or more functions described above in reference to FIG. 1A.

In some embodiments, control parameters 212 are provided through an application. For example, Application C 240 can provide the haptics module 145 a plurality of control parameter 242 (e.g., such as volume, taps (or frequency), and duration) that is used to determine perceived semantics 217 for a haptic response for urgency (e.g., urgency plot 248), where the haptic response for urgency is used for determining a haptic response that is delivered to a user at a wrist-wearable device 188 (when a haptic response is delivered by one or more haptic generators 125 FIG. 1A). More specifically, the haptics module 145 applies one or more control parameter of the plurality of control parameter 242 to one or more functions (represented by f(x1, fx2, fx3, . . . ) 244) to generate an urgency haptics response. This can allow the haptics module 145 to generate interpretable haptic responses for a user based on the use of complex functions and any number of control parameter. The haptic response for urgency (or any other semantic haptic response) can have a plurality of levels (e.g., high, medium, or low urgency). As described above, control parameters 212 can be changed by the user or the developer of the application (e.g., at the time of an application update).

In some embodiments, a semantic haptic response determined for a first application can be used to determine a semantic haptic response for another application. For example, the urgency haptic response generated for Application C 240 can be used to determine a semantic haptic response for Application D 250. In particular, the haptics module 145 applies a Bayesian Optimization Model (e.g., hf(x) 254) to determine a mapping between tunables and their semantic interpretations. Further, the mapping is used to determine a function for urgency for the distinct application (Application D 250). In some embodiments, the determined function for a semantic haptic response can be used to generate a control parameter for directly modulating the semantic haptic response. For example, the determined function for urgency can be used to generate an urgency control parameter 252 for directly modulating the urgency haptic response (e.g., urgency plot 248).

Figure 3A:
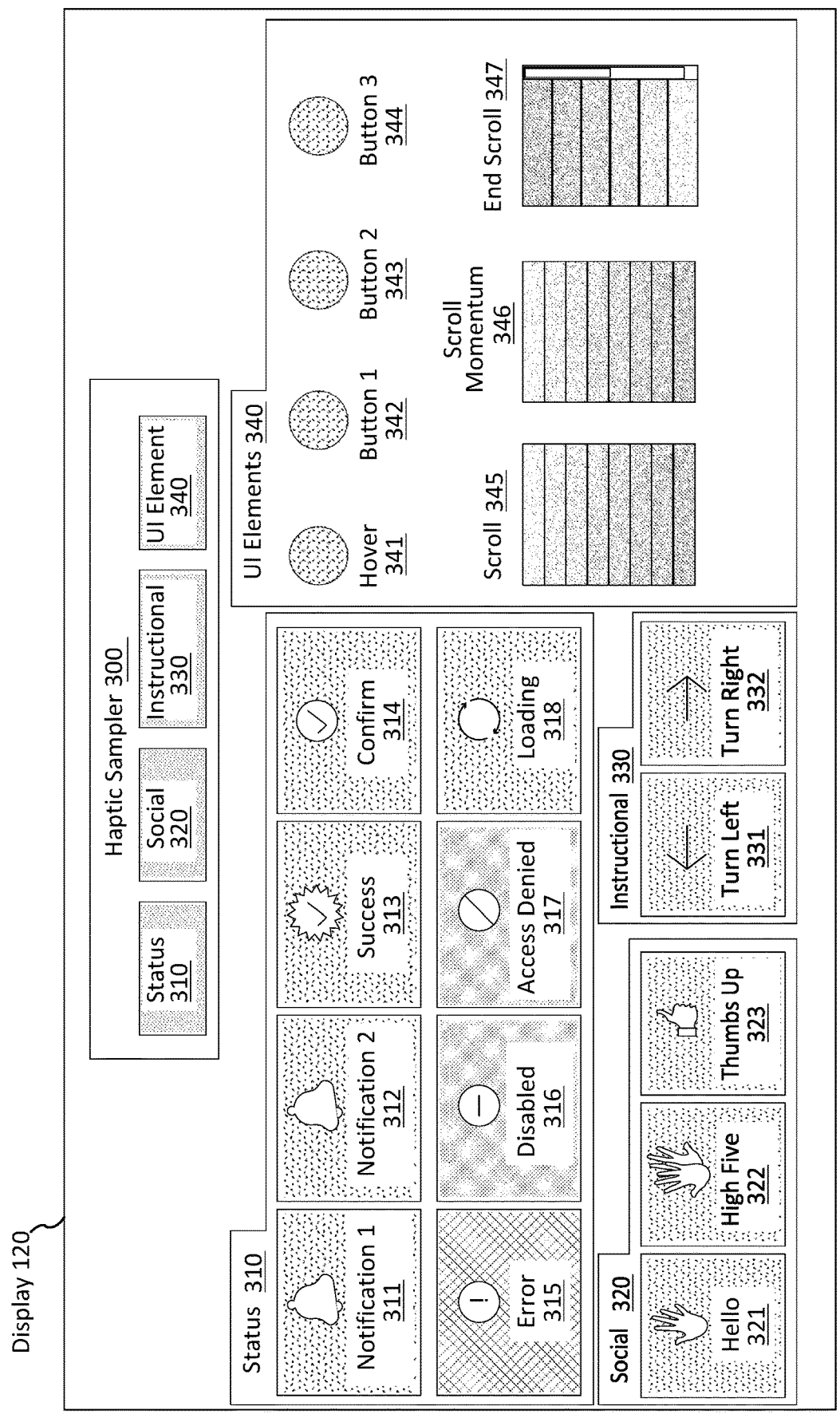
FIGS. 3A and 3B illustrate different UIs for providing one or more control parameters (or tunables) to a haptic effects library for determining one or more haptic responses, in accordance with some embodiments.
Figure 3B:
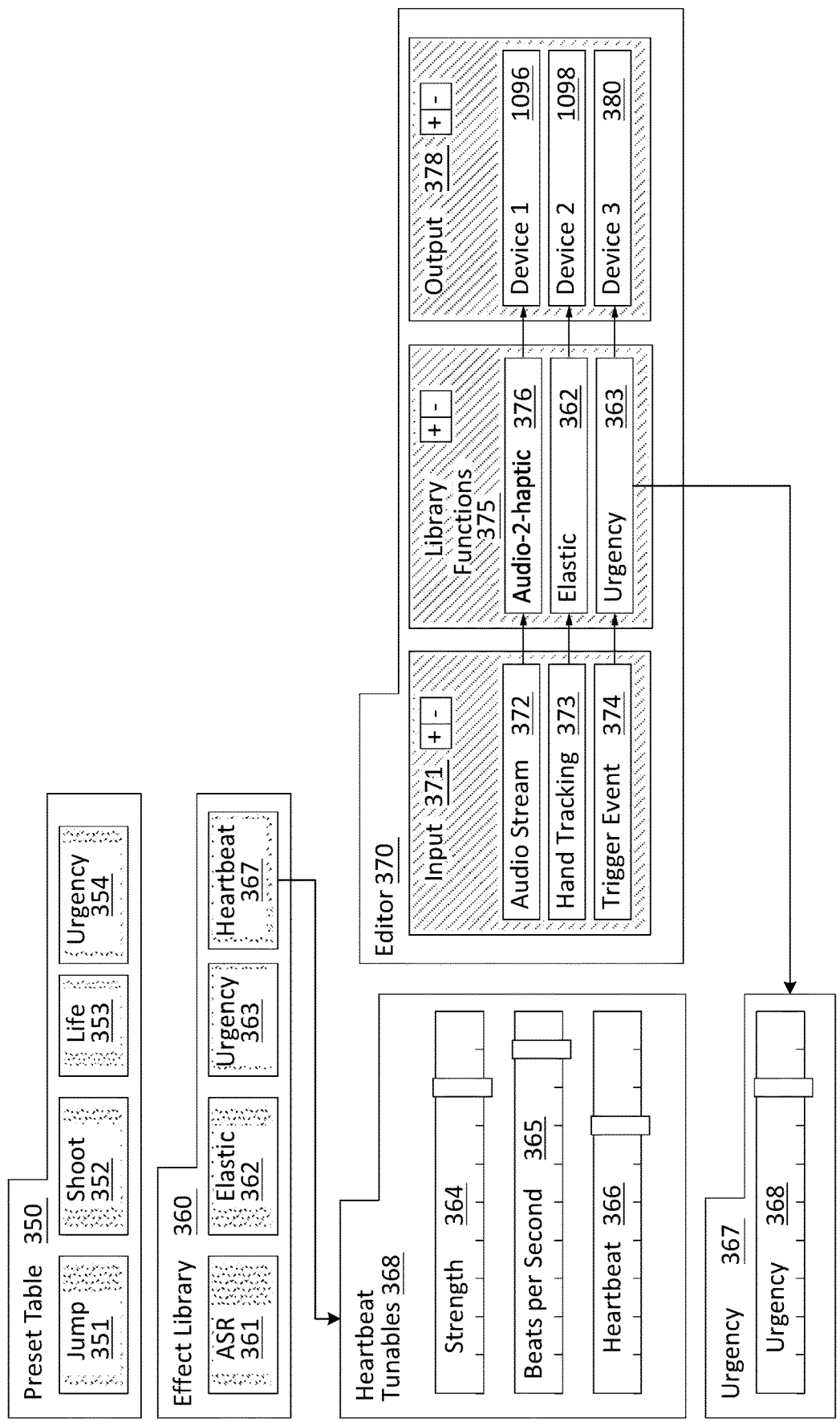

Moving now to FIGS. 3A and 3B, illustrated there are different UIs for providing one or more control parameters (or tunables) to a haptic effects library for determining one or more haptic responses, in accordance with some embodiments. The different UIs can be displayed, via a display, of a device, such as a wrist-wearable device 188, a head-worn wearable device 182, and/or an electronic device 174 described above in reference to FIG. 1A. In some embodiments, the one or more UIs are part of a device UI configured to apply one or more control parameters to different applications. Alternatively or in addition, in some embodiments, the one or more UIs are part of one or more applications 135 (FIG. 1A) and allow the user to provide one or more control parameters for a respective application. The one or more control parameters provided by the different UIs can be used to determine one or more perceptual and/or semantic haptic response. In some embodiments, the different UIs can include an editor, a sampler application, a previewer application, and/or an immersive application. In some embodiments, the user interface can include UI elements (e.g., buttons, sliders, etc.), UI activities (e.g., button press, trigger, thumb-stick actions, etc.). In some embodiments, the UIs can be used to define user gestures and/or haptic game effects. The different UIs are discussed in detail below.

The user interfaces and individual user interface elements shown in FIG. 3A can be shown collectively or individually, as appropriate, in various different embodiments or circumstances. In one example, these user interfaces and individual user interface elements are displayed (e.g., via a display 120), at a laptop of desktop computing device associated with a game developer, such that the game developer is able to create a library of haptic effects for providing both predefined and parametrically-defined haptic responses for various aspect of their game. In other embodiments or circumstances, the user interfaces and elements are displayed at a laptop or desktop computing device associated with a provider of an operating system or application-distribution system with which the game developer is associated, such as an operating system for a virtual-reality headset (e.g., any of the Oculus products, or other VR or AR headsets, form Meta Platforms Technologies), which then allows this provider to provide game developers (and other types of developers) with at least a starting point set of predefined and parametrically-defined haptic responses. Alternatively or additionally, in some embodiments, the user interfaces can be presented to the user via a smartphone, head-wearable device, wrist-wearable device, or other user device such that the user can customize specific haptic effects.

In some embodiments, the one or more UIs include a haptic sampler UI 300 that allows a user to quickly preview a haptic response and/or access different UIs for predefined haptic categories. For example, the haptic sample UI 300 includes UI elements for a status UI 310, a social UI 320, an instruction UI 330, and UI element UI 340. Each UI element, when selected, causes the display of the device to present an associated UI. For example, selection of the UI element for the status UI 310 causes the display of a device to present the status UI 310, which includes one or more UI elements for quickly accessing haptic responses provided for one or more status updates.

As shown in the status UI 310, haptic responses can be provided for different notifications (e.g., first and second notifications 311 and 312), success notifications 313 (which are provided when an action to task is performed successfully), confirmation notifications 314 (which are provided when a user is asked to provide confirmation), error notifications 315 (which are provided when an action to task does not complete or fails), disabled notifications 316 (haptic responses that are suppressed or replaced with a particular haptic response for a particular action, task, application, etc.), access denied notifications 317 (which are provided to notify a user that they do not have the necessary permission to perform a particular action or task or access an application or other function of a device), and loading notifications 318 (which are provided to a user while an action, task, application, or other function on the device is loading). Each UI, when selected, the display of a device to present a UI for adjusting the associated haptic responses. The different UIs for adjusting the associated haptic responses are described below in reference to FIG. 3B.

Selection of the UI element for the social UI 320 causes the display of a device to present a social UI 320, which includes one or more UI elements for quickly accessing haptic responses provided for one or more social interactions (via an application or the device). For example, the social UI 320 can include UI elements for defining haptics responses for greetings (e.g., hello UI element 321), enthusiasm or celebration gestures (e.g., high five UI element 322), and approval gestures (e.g., thumbs up UI element 323).

Similarly, selection of the UI element for the instructional UI 330 causes the display of a device to present the instructional UI 330, which includes UI elements for defining haptic responses provided for instructions provided to the user. For example, the instructional UI 330 can include UI elements for defining haptics responses for directions, such as left and right turns (e.g., turn left and turn right UI elements 331 and 332), providing a particular input (e.g., providing a password), and/or other requests for information.

Selection of the UI element for the UI elements UI 340 causes the display of a device to present the UI elements UI 340, which includes one or more UI elements for quickly accessing haptic responses provided for interaction with one or more UI elements (via an application or the device). For example, the UI elements UI 340 can include UI elements for defining haptics responses for hovering over a UI element (e.g., hover UI element 341), selecting one or more (virtual or physical) buttons (e.g., button 1, button 2, and button 3 UI elements 342, 343, and 344), as well as one or more haptic responses for interaction with scroll UIs (e.g., as shown by scroll UI element 345, scroll momentum UI element 346, and end scroll UI element 347).

Turning to FIG. 3B, different UIs for adjusting haptic responses are described. In particular, FIG. 3B shows a preset table UI 350, an effect library UI 360, and an editor UI 370. In some embodiments, the preset table UI 350 includes one or more UI elements for selecting and applying predefined haptic responses. For example, the preset table UI 350 can include UI elements for applying a jump haptics response 351, a shoot haptics response 352, a life haptics response 353, and an urgency haptics response 354. In some embodiments, haptic responses in the preset table UI 350 are predefined by an application or a device. In some embodiments, the haptics module 145 applies one or more tunables to predefined haptic responses to improve a user's experience.

The effect library UI 360 includes one or more UI elements for selecting and applying one or more functions for determining a haptic response. For example, the effect library UI 360 includes UI elements for applying an attack sustain release (ASR) function 361, an elastic function 362, an urgency function 363, and a heartbeat function 367. In some embodiments, the haptics module 145 applies one or more tunables to a selected function to generate a customizable haptic response as described above in reference to FIGS. 2A and 2B. More specifically, the selected functions can be used to generate one or more perceptual haptic response and semantic haptic response. The functions shown in the effect library UI 360 are non-exhaustive; additional examples of the one or more functions are provided above in reference to FIG. 1A.

In response to selection of a UI element for applying a function for determining a haptic response, a tunables UI is presented to a user. The tunables UI allows the user to adjust one or more control parameters provided to a selected function. For example, in response to selection of the heartbeat function 367 UI element, a heartbeat tunables UI 368 is presented to the user. The heartbeat tunables UI 368 allows the user to adjust one or more control parameters (e.g., strength 364, beats per second 365, and heartbeat 366) that allow the haptics module 145 (FIG. 1A) to generate respective perceptual and/or semantic haptic responses that are customized for the user.

The editor UI 370 includes at least an input UI 371, a library functions UI 375, and an output UI 378. The editor UI 370 is configured to allow the user to define control parameters and/or a source of one or more control parameters to be used in generating a haptic response, as well as allow the user to define one or more functions to be used in generating a haptics response and define an output device to be used to deliver the haptics response.

In particular, the input UI 371 allows for the user to add or remove (e.g., via the "+" and "−" UI elements) one or more sources that provide control parameters and data inputs for generating a haptics response via the haptics module 145. For example, an audio stream 372 can be used to provide one or more control parameters (e.g., beats per minute, tempo, etc.) to the haptics module 145 that are used to generate a haptic response, such as vibrations and/or visual cues, that is provided to one or more devices (e.g., head-worn wearable device 182, wrist-wearable device 188, or other device described in FIG. 1A). Similarly, hand tracking 373 data (e.g., hang gestures, phalanges movement, etc.) and trigger events 374 (e.g., receiving a message, arriving at a location, a time occurrence, etc.) can be provided to the haptics module 145 as one or more control parameters that are used generate a haptic response.

The library functions UI 375 allows for the user to select one or more functions to be used by the haptics module 145 in generating a haptics response as describe above in reference to FIGS. 1A-2B. The library functions UI 375 allows the user to add or remove (e.g., via the "+" and "−" UI elements) one or more functions to generate a haptics response. A selected function is associated with one or more input sources (selected by the user in the input UI 371 or automatically selected by the haptics module 145), such that the selected function receives one or more control parameters from the one or more associated input sources. For example, an audio-2-haptic function 376 (such as an ASR or ADSR function) is associated with the audio stream 372 such that data from the audio stream 372 is used in generating a haptics response. Similarly, the elastic function 362 (e.g., configured to simulate elasticity, as described above) is associated with the hand tracking 373 data stream and the urgency function 363 is associated with trigger events 374. In some embodiments, UI elements in the library functions UI 375 can be selected to allow the user to further customize one or more control parameters of a function. For example, selection of the urgency function 363 UI element causes an urgency UI 369 to be presented to the user such that the user can further define one or more control parameters for generating perceptual and semantic haptic responses using the haptics module 145.

The output UI 378 allows for the user to select one or more devices to generate a haptic response based on a haptic response received from the haptics module 145. The output UI 378 allows the user to add or remove (e.g., via the "+" and "−" UI elements) one or more devices (e.g., device 1 1096, device 2 1098, and device 3 380) to generate haptic responses. A selected device is associated with an output of one or more functions selected in the library functions UI 375. In some embodiments, a device is automatically selected based on the haptic generators available on the device. Additional information on the one or more devices is provided above in reference to FIG. 1A.

Figure 4:
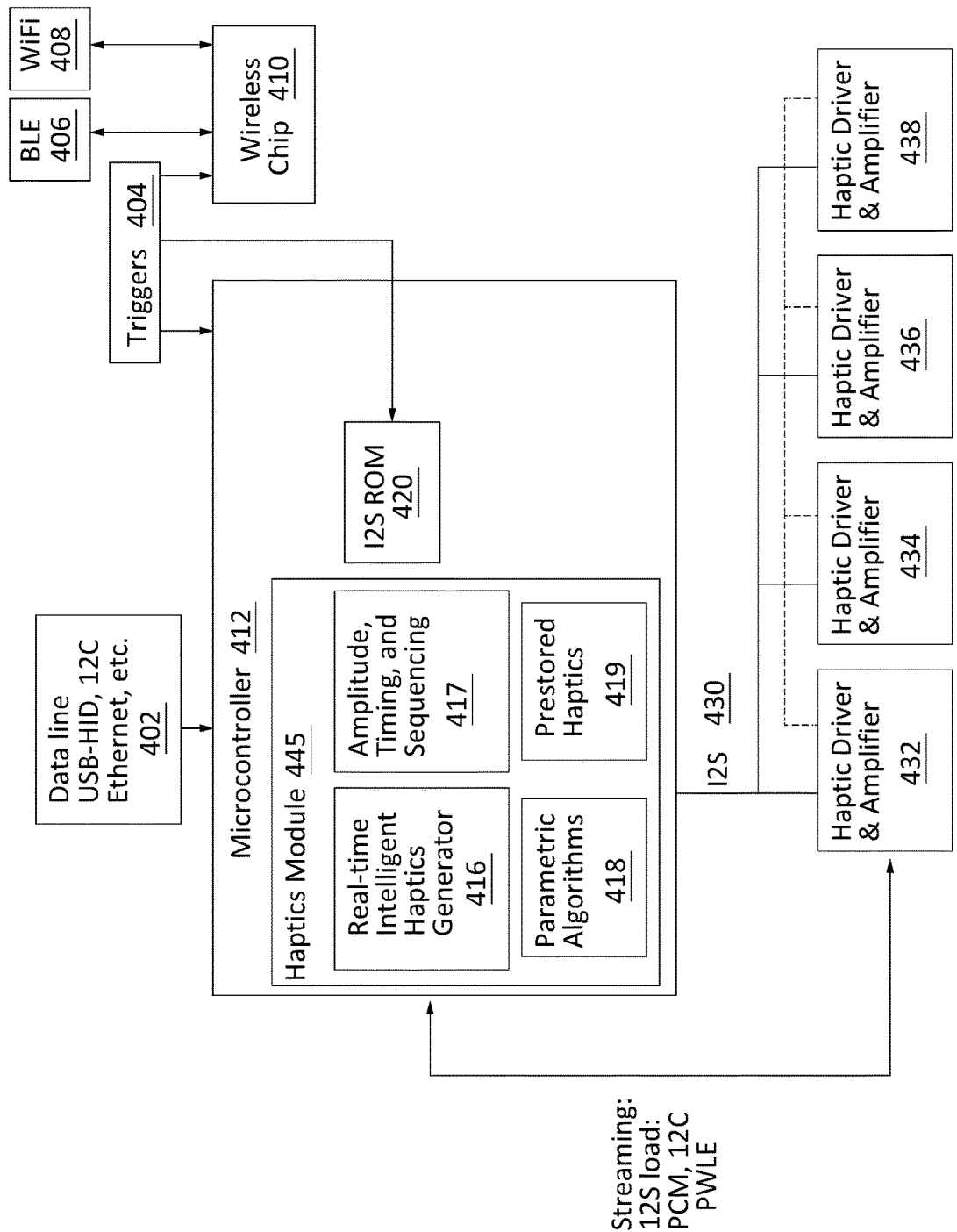
FIG. 4 illustrates an example haptics module implemented on a microcontroller, in accordance with some embodiments.

FIG. 4 illustrates an example haptics module implemented on a microcontroller, in accordance with some embodiments. The microcontroller 412 includes a data line 402 (e.g., such as USB-HID, ethernet, or other), one or more wireless communication components (e.g., such as a BLE antennae 406, WiFi 408, and a wireless chip 410), an electrical serial bus interface (I2S) 420, the artificial intelligence (AI) haptics module 445, and one or more haptics drivers and amplifiers 432, 434, 436, and 438. The one or more haptics drivers and amplifiers 432, 434, 436, and 438 are analogous to drivers 1080 and haptic generators 125 (FIG. 1A-1D). The I2S 420 is configured to communicate one or more triggers 404 to the AI haptics module 445. In some embodiments, the I2S is configured to provide haptic response to at least 8 haptics drivers and amplifiers 432, 434, 436, and 438.

The AI haptics module 445 includes a real-time intelligent haptics generator 416, an amplitude, timing, and sequencing module 417, one or more parametric algorithms 418, and prestored haptic effects 419. The one or more components of the AI haptics module 445 are configured to dynamically determine one or more haptic responses with little to no user input. More specifically, the AI haptics module 445 determines one or more haptic responses based on received triggers (e.g., data feeds). The AI haptics module 445 is configured to determine one or more perceptual and semantic haptic response as discussed above. The AI haptics module 445 can be incorporated to in the haptics module 145 described above in reference to FIGS. 1A-1D to further improve user experience. In particular, the AI haptics module 445 is configured to adjust the tunable values of the generated haptic responses described above based on user preferences learned over time, current use of a device (e.g., in a game, on a call, in a messaging user interface, etc.), ongoing events in an application (e.g., changes in a game environments), and/or other factors.

Figure 5:
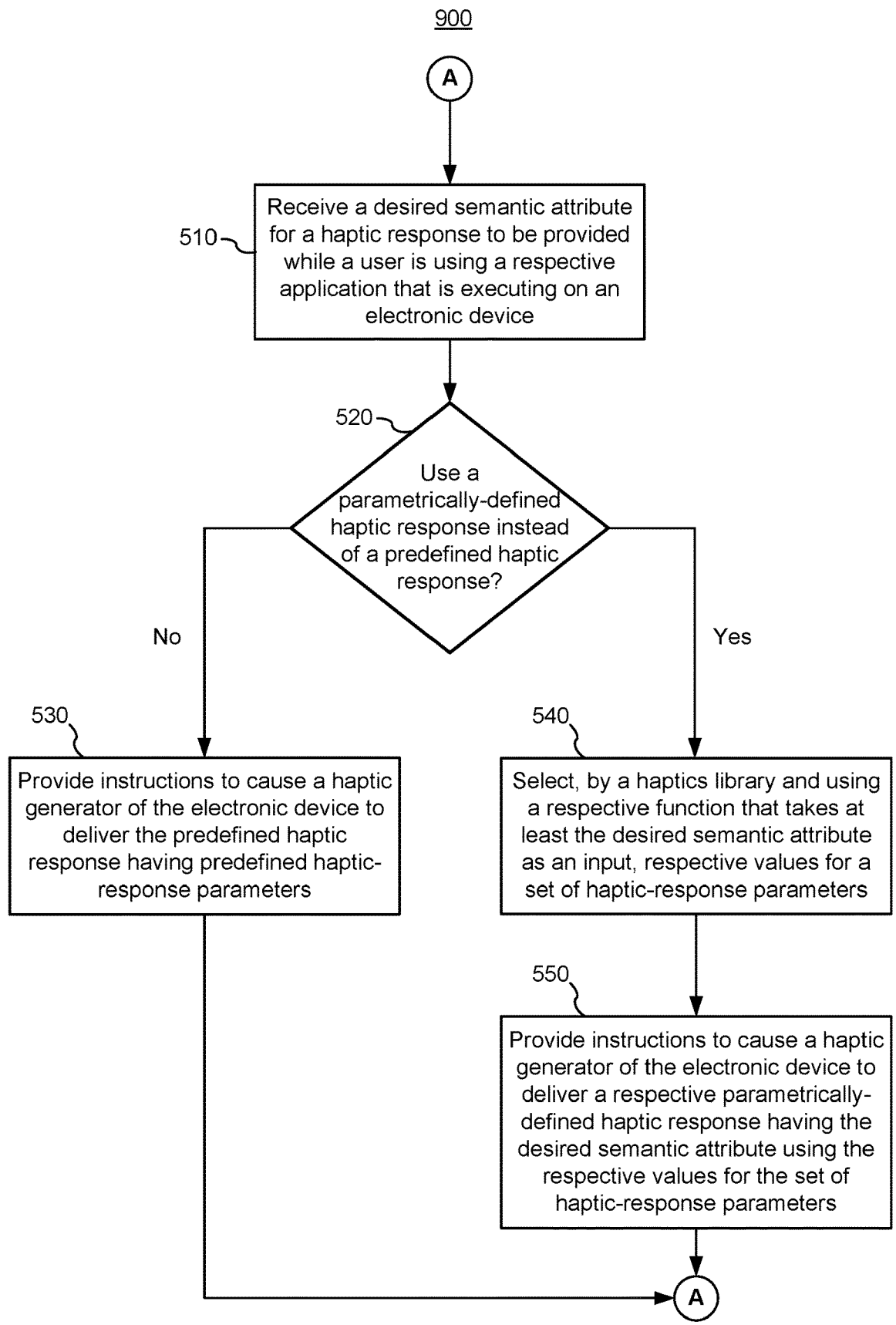
FIG. 5 is a flow diagram illustrating a method of using a haptics library to determine whether to provide predefined haptic responses or parametrically-defined haptic responses, in accordance with some embodiments.

FIG. 5 is a flow diagram illustrating a method of using a haptics library to determine whether to provide predefined haptic responses or parametrically-defined haptic responses, in accordance with some embodiments. Operations (e.g., steps) of the method 500 can be performed by one or more processors (e.g., central processing unit 150 and/or MCU 1010 FIGS. 1A-1C) of one or more devices described above in reference 1A-1C (e.g., a computer, 174a, a smartphone 174b, a controller 174c, a head-worn wearable device 182, a wrist-wearable device 188, etc.). In some embodiments, the one or more devices are coupled with one or more sensors (e.g., various sensors 121 described above in reference to FIGS. 1A-1C), a display 120, an image device 155, a microphone, a speaker, and one or more haptic generators (e.g., actuators, speakers, motors, and other devices configured to provide sensory feedback to a user) to perform the one or more operations. At least some of the operations shown in FIG. 5 correspond to instructions stored in a computer memory or computer-readable storage medium (e.g., memory 160; FIGS. 1A-1C). Operations of the method 500 can be performed by a single device (e.g., a wrist-wearable device 188) or at least two devices communicatively coupled to one another (e.g., the wrist-wearable device 118 and a smartphone, a computer, and a head-worn wearable device 182, a server 170 and a wrist-wearable device 188, etc.). Additionally or alternatively, operations of the method 500 can be performed by instructions stored in memory or computer-readable medium of another device communicatively coupled to one or more devices described above in reference to FIGS. 1A-1D.

The method 500 includes receiving (510) a desired semantic attribute for a haptic response to be provided while a user is using a respective application that is executing on an electronic device (an identification of the desired semantic attribute can be provided by a virtual-reality application and/or by an operating system on which the virtual-reality application is executing). The method 500 further includes determining (520) whether to use a parametrically-defined haptic response instead of a predefined haptic response. For example, as described above in reference to FIGS. 1A-2B, one or more tunables are used to generate semantic haptic responses, perceptual haptic responses, or a combination of the two. The one or more tunables can be provided by the user, one or more applications, and/or one or more data feeds. In some embodiments, when customizable haptics are not available or configured for use, predefined haptic responses are used. The customizable haptics (which can be produced using defined parametric functions) and predefined haptic responses used in conjunction with the method 500 can be ones that were generated using the user interfaces and elements described above in references to FIGS. 3A-3B.

In accordance with a determination to use a predefined haptic response ("No" at operation 520), the method includes providing (530) instructions to cause a haptic generator of the electronic device to deliver the predefined haptic response having predefined haptic response parameters. Alternatively, in accordance with a determination to use a parametrically-defined haptic response ("Yes" at operation 520), the method includes selecting (540), by a haptics library and using a respective function that takes at least the desired semantic attribute as an input, respective values for a set of haptic-response parameters. Further, the method includes providing (550) instructions to cause a haptic generator of the electronic device to deliver a respective parametrically-defined haptic response having the desired semantic attribute using the respective values for the set of haptic-response parameters. The parametrically-defined haptic responses are described above in reference to FIGS. 2A and 2B.

After providing instructions, the method 500 returns to operation 510 and waits to receive an additional desired semantic attribute.

Figure 6:
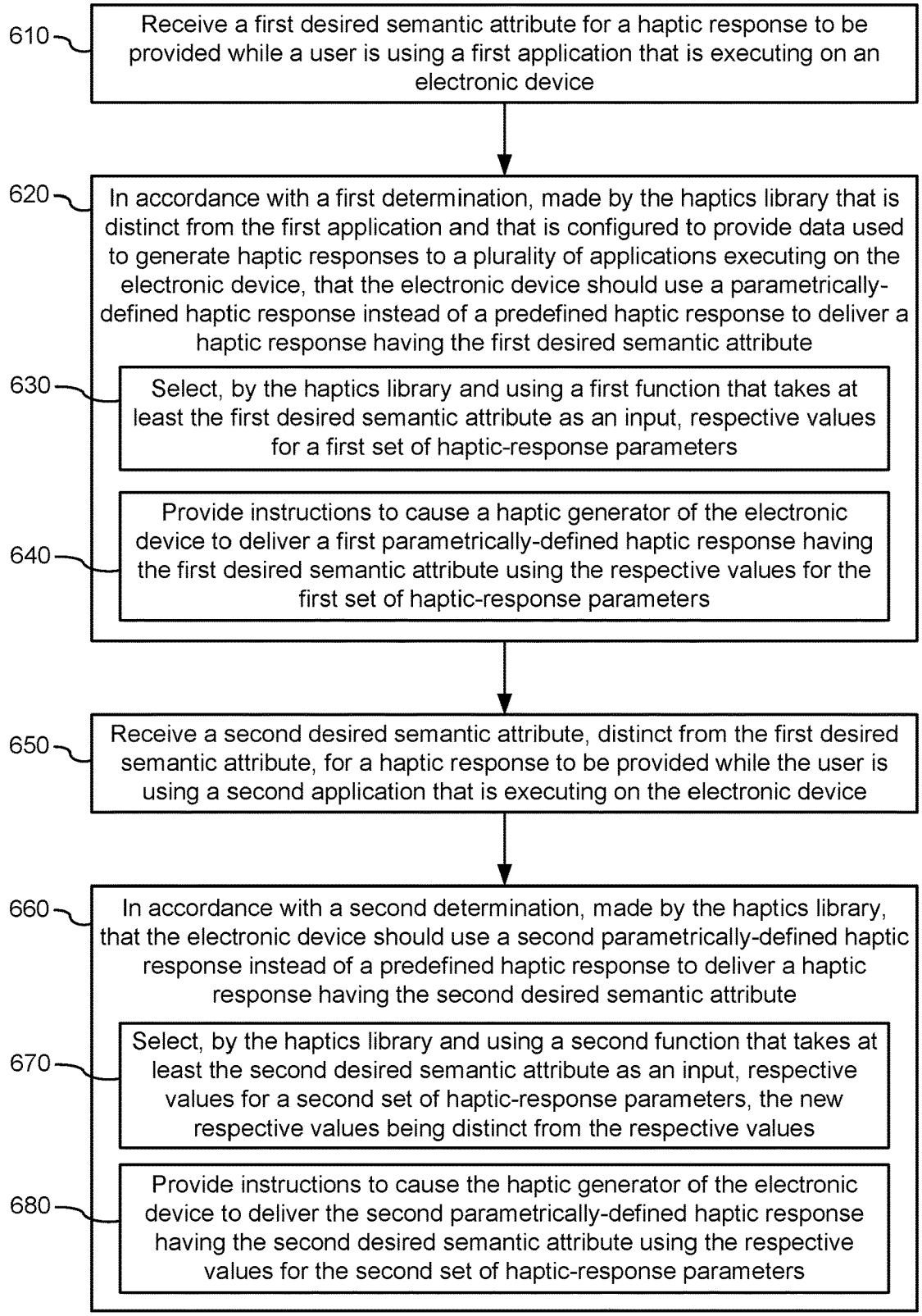
FIG. 6 is a detailed flow diagram illustrating a method of using a haptics library to determine whether to provide predefined haptic responses or parametrically-defined haptic responses, in accordance with some embodiments.

FIG. 6 is a detailed flow diagram illustrating a method of using a haptics library to determine whether to provide predefined haptic responses or parametrically-defined haptic responses, in accordance with some embodiments. Similar to method 500 of FIG. 5, operations of the method 600 can be performed by one or more processors of the one or more devices described above in reference 1A-1D (e.g., via a microcontroller 1010 or one or more processors of a system 1001 or server 170). At least some of the operations shown in FIG. 6 correspond to instructions stored in a computer memory or computer-readable storage medium. Operations of the method 600 can be performed by a single device or at least two devices communicatively coupled to one another. Additionally or alternatively, operations of the method 600 can be performed by instructions stored in memory or computer-readable medium of another device communicatively coupled to one or more devices described above in reference to FIGS. 1A-1C.

Method 600 includes receiving (610) a first desired semantic attribute for a haptic response to be provided while a user is using a first application that is executing on an electronic device. A semantic attribute is a control parameter associated with an interpretable significance for the haptic response, such as a feeling of urgency; an emotional feeling (e.g., happiness, success, failure, fear, sadness, enthusiasm, etc.); a sensation (e.g., elasticity, weight, resistance, etc.); material properties (e.g., roughness, stiffness, tightness, flexibility, etc.); and any number of interpretable feelings and sensations that can be conveyed to the user. In some embodiments, the method 600 includes receiving one or more perceptual attributes for the haptic response (or another haptic response) to be provided while a user is using the first application that is executing on an electronic device. A perceptual attribute is a control parameter associated with a physical property for the haptic response, such as strength speed, size, etc. Additional examples of the perceived and semantic attributes are provided above in reference to FIGS. 2A and 2B.

In some embodiments, the first desired semantic attribute is received via the electronic device, or another device communicatively coupled to the electronic device. For example, as shown and described above in reference to FIG. 1A, a wrist-wearable device 188 can receive one or more tunables (e.g., semantic, and perceived attributes) from one or more a head-worn wearable device 182, electronic devices 174, and a server 170. In some embodiments, the one or more tunables are received from one or more applications, a data feed, user activity, and/or any other ongoing processes on the electronic device. In some embodiments, the first desired semantic attribute dynamically changes over time (e.g., is updated by the ongoing processes on the electronic device). In some embodiments, the first desired semantic attribute is received from a user (e.g., using one or more UIs on the electronic device or one or more applications 135). Different examples of UIs for defining the one or more tunables are provided above in reference to FIGS. 3A and 3B. In some embodiments, the first application can include a social-media application (e.g., Facebook), a gaming application, a messaging application (e.g., WhatsApp), or other applications described above in reference to FIG. 1A. In some embodiments, the first application is the haptics library (e.g., a program that when executed causes the electronic device to display a UI that allows a user to define one or more tunables for the electronic device and/or one or more other applications).

Method 600 includes, in accordance with a first determination (620), made by the haptics library that is distinct from the first application and that is configured to provide data used to generate haptic responses to a plurality of applications executing on the electronic device, that the electronic device should use a parametrically-defined haptic response instead of a predefined haptic response to deliver a haptic response having the first desired semantic attribute (a) selecting (630), by the haptics library and using a first function that takes at least the first desired semantic attribute as an input, respective values for a first set of haptic-response parameters; and providing (640) instructions to cause a haptic generator of the electronic device to deliver a first parametrically-defined haptic response having the first desired semantic attribute using the respective values for the first set of haptic-response parameters. Use of the first function and selection of the first set of haptic-response parameters is described above in reference to FIGS. 2A and 2B.

In some embodiments, the method 600 provides instructions to cause the haptic generator of the electronic device to deliver the predefined haptic response when customizable haptics are not available or configured for use (e.g., haptic generators are not available, or the first set of haptic-response parameters is invalid or incomplete). More specifically, in accordance with a determination, made by a haptics library that the first desired semantic attribute it outside a defined desired semantic attribute thresholds for the electronic device, the method 600 includes providing a predefined haptic response and providing instructions to cause the electronic device to deliver a first predefined haptic response having the first desired semantic attribute using the respective values for the first set of haptic-response parameters. For example, if the first desired semantic attribute results in respective values for the first set of haptic-response parameters that request more than 115 decibels and the haptic generator of the electronic device only supports 100 decibels, the method 600 provides instructions to cause the haptic generator of the electronic device to deliver the predefined haptic response which are within the electronic devices parameters (e.g., unless another device that can support the first set of haptic-response parameters is communicatively coupled to the electronic device, such as speakers communicatively coupled to a smartphone where the speakers deliver the first parametrically-defined haptic response). Alternatively, in some embodiment, if the overall experience of the produced haptic responses is not degraded, the method can include scaling the first parametrically-defined haptic response (along with other haptic responses) such that the first desired semantic attribute it within a defined desired semantic attribute threshold.

In some embodiments, the predefined haptic responses are device-specific, application-specific, actuator-specific, user-interface-element-specific, and combinations thereof. In some embodiments, the haptic-response parameters include two or more of an amplitude, a frequency, a pulse rate, a signal envelope, a duration, a signal extent/speed, or fundamental frequency. The above-list of haptic-response parameters is non-exhaustive; other haptic-response parameters can be used to define different haptic responses. Although the above examples describe the use of semantic attributes for the selection of respective set of haptic-response parameters, as the skilled artisan will appreciate upon reading the descriptions provided herein, the perceived and semantic attributes, either alone or in combination, can be used to select respective values for a set of haptic-response parameters that are used to define a parametrically-define haptic response.

Method 600 includes receiving (650) a second desired semantic attribute, distinct from the first desired semantic attribute, for a haptic response to be provided while the user is using a second application that is executing on the electronic device. In some embodiments, the second desired semantic attributes are received via a UI and/or the second application as described above in reference to FIGS. 1A-3B. The method 600 further includes, in accordance with a second determination (660), made by the haptics library, that the electronic device should use a second parametrically-defined haptic response instead of a predefined haptic response to deliver a haptic response having the second desired semantic attribute (a) selecting (670), by the haptics library and using a second function that takes at least the second desired semantic attribute as an input, respective values for a second set of haptic-response parameters, the new respective values being distinct from the respective values; and (b) providing (680) instructions to cause the haptic generator of the electronic device to deliver the second parametrically-defined haptic response having the second desired semantic attribute using the respective values for the second set of haptic-response parameters. In some embodiments, the second function also takes the first desired semantic attribute as an input for determining the respective values for the second set of haptic-response parameters. Similarly, in some embodiments, the first function also takes the second desired semantic attribute as an input for determining the respective values for the first set of haptic-response parameters.

The second parametrically-defined haptic response can be the same or different from the first parametrically-defined haptic response. In other words, the haptics library is configured determine respective parametrically-defined haptic responses for one or more applications independently. In some embodiments, the haptics library determines one or more parametrically-defined haptic responses at the same time. For example, while an electronic device is executing a gaming application and a music streaming application, the haptics library can determine a first parametrically-defined haptic response for the gaming application and a second parametrically-defined haptic response for the music streaming application. In some embodiments, the haptics library uses respective tunables of each application executing on the electronic device and generates a comprehensive parametrically-defined haptic response that synchronizes haptic responses between the applications. For example, while an electronic device is executing a gaming application and a music streaming application, the haptics library can use respective tunables from the gaming and music streaming applications to generate a comprehensive parametrically-defined haptic response that synchronizes the haptic effects between the applications to further immerse a user.

In some embodiments, the method 600 includes receiving a third desired semantic attribute, distinct from the first desired semantic attribute and/or the second desired semantic attribute, for a haptic response to be provided while the user is using a third application that is executing on the electronic device. The method 600 includes, in accordance with a third determination, made by the haptics library, that the electronic device should use a third parametrically-defined haptic response instead of a predefined haptic response to deliver a haptic response having the third desired semantic attribute (a) selecting, by the haptics library and using a third function that takes at least the third desired semantic attribute as an input, respective values for a third set of haptic-response parameters, the respective values for the third set of haptic-response parameters being distinct from the respective values and new respective values. The method 600 further includes providing instructions to cause a second haptic generator of the electronic device, distinct from the first haptic generator, to deliver a third parametrically-defined haptic response having the third desired semantic attribute using the respective values for the third set of haptic-response parameters. In some embodiments, the third desired semantic attribute is the same as the first desired semantic attribute or the second desired semantic attribute. In some embodiments, the second haptic generator is the same or distinct from the first haptic generator. The instructions to cause the first and second haptic generators of the electronic device to deliver respective parametrically-defined haptic responses can be provided at the same time.

In some embodiments, the electronic device is a first electronic device, and the method 600 further include receiving a fourth desired semantic attribute for a haptic response to be provided while the user is using a fourth application that is executing at a second electronic device. The method 600 further includes, in accordance with a fourth determination, made by the haptics library, that the second electronic device should use a fourth parametrically-defined haptic response instead of a predefined haptic response to deliver a haptic response having the fourth desired semantic attribute (a) selecting, by the haptics library and using a fourth function that takes at least the fourth desired semantic attribute as an input, respective values for a fourth set of haptic-response parameters, the respective values for the fourth set of haptic-response parameters being distinct from the respective values and new respective values; and (b) providing instructions to cause a second haptic generator of the second electronic device to deliver a fourth parametrically-defined haptic response having the fourth desired semantic attribute using the respective values for the fourth set of haptic-response parameters. In other words, the haptics library can determine parametrically-defined haptic responses for different responses. For example, as shown and described above in FIG. 1A, in some embodiments two different devices (e.g., head-worn wearable device 182 and wrist-wearable device 188) can work in conjunction with one another. In some embodiments, the parametrically-defined haptic responses can be generated by one device (e.g., the wrist-wearable device 188 or a server 170) and shared with another device (e.g., head-worn wearable device 182) via a communications interface 115 or a haptic API 186. In some embodiments, the fourth application is the same as the first, second, and/or third application (e.g., the head-worn wearable device 182 and the wrist-wearable device 188 can both work in conjunction with one another when the device is operating a game application). Alternatively, in some embodiments, the fourth application is the distinct from the first, second, and/or third applications.

In some embodiments, the haptics library is implemented in one or more of the cloud, a server, a laptop, a wearable device (such as a wrist-wearable device 188 and a head-worn wearable device 182), a tablet, a phone, and a controller.

Further embodiments also include various subsets of the above embodiments including embodiments in FIGS. 1A-6 combined or otherwise re-arranged.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of using a haptics library to determine whether to provide predefined haptic responses or parametrically-defined haptic responses, the method comprising:
   receiving a first desired semantic attribute for a haptic response to be provided while a user is using a first application that is executing on an electronic device;
   in accordance with a first determination, made by the haptics library that is distinct from the first application and that is configured to provide data used to generate haptic responses to a plurality of applications executing on the electronic device, that the electronic device should use a parametrically-defined haptic response instead of a predefined haptic response to deliver a haptic response having the first desired semantic attribute:
      selecting, by the haptics library and using a first function that takes at least the first desired semantic attribute as an input, respective values for a first set of haptic-response parameters; and
      providing instructions to cause a haptic generator of the electronic device to deliver a first parametrically-defined haptic response having the first desired semantic attribute using the respective values for the first set of haptic-response parameters;
   receiving a second desired semantic attribute, distinct from the first desired semantic attribute, for a haptic response to be provided while the user is using a second application that is executing on the electronic device; and
   in accordance with a second determination, made by the haptics library, that the electronic device should use a second parametrically-defined haptic response instead of the predefined haptic response to deliver a haptic response having the second desired semantic attribute:
      selecting, by the haptics library and using a second function that takes at least the second desired semantic attribute as an input, new respective values for a second set of haptic-response parameters, the new respective values being distinct from the respective values; and
      providing instructions to cause the haptic generator of the electronic device to deliver the second parametrically-defined haptic response having the second desired semantic attribute using the respective values for the second set of haptic-response parameters.

2. The method of claim 1, further comprising:
   receiving a third desired semantic attribute, distinct from the first desired semantic attribute and/or the second desired semantic attribute, for a haptic response to be provided while the user is using a third application that is executing on the electronic device;
   in accordance with a third determination, made by the haptics library, that the electronic device should use a third parametrically-defined haptic response instead of a predefined haptic response to deliver a haptic response having the third desired semantic attribute:
      selecting, by the haptics library and using a third function that takes at least the third desired semantic attribute as an input, respective values for a third set of haptic-response parameters, the respective values for the third set of haptic-response parameters being distinct from the respective values and new respective values; and
      providing instructions to cause the haptic generator of the electronic device to deliver a third parametrically-defined haptic response having the third desired semantic attribute using the respective values for the third set of haptic-response parameters.

3. The method of claim 1, wherein the electronic device is a first electronic device, and the method further comprises:
   receiving a fourth desired semantic attribute for a haptic response to be provided while the user is using a fourth application that is executing at a second electronic device;
   in accordance with a second determination, made by the haptics library, that the second electronic device should use a fourth parametrically-defined haptic response instead of a predefined haptic response to deliver a haptic response having the fourth desired semantic attribute:
      selecting, by the haptics library and using a fourth function that takes at least the fourth desired semantic attribute as an input, respective values for a fourth set of haptic-response parameters, the respective values for the fourth set of haptic-response parameters being distinct from the respective values and new respective values; and
      providing instructions to cause a second haptic generator of the electronic device to deliver a fourth parametrically-defined haptic response having the fourth desired semantic attribute using the respective values for the fourth set of haptic-response parameters.

4. The method of claim 1, wherein the haptics library is implemented in one or more of the cloud, a server, a laptop, a wearable device, a tablet, a phone, and a controller.

5. The method of claim 1, wherein the first desired semantic attribute and the second desired semantic attribute are determined based on a user input.

6. The method of claim 5, wherein the user input is received at a user interface element displayed by the electronic device.

7. The method of claim 6, wherein selecting, by the haptics library and using the second function that takes at least the second desired semantic attribute as the input includes:
   receiving, via one or more user interface elements, one or more additional user inputs; and
   applying the one or more additional user inputs to the second function.

8. The method of claim 6, where the first function also takes as inputs a specific user interface element to which the user input was directed.

9. The method of claim 1, further comprising:
in accordance with a determination, made by a haptics library that the first desired semantic attribute it outside a defined desired semantic attribute thresholds for the electronic device, providing a predefined haptic response; and
providing instructions to cause the electronic device to deliver a first predefined haptic response having the first desired semantic attribute using the respective values for the first set of haptic-response parameters.

10. The method of claim 9, wherein the predefined haptic responses are device-specific, application-specific, actuator-specific, user-interface-element-specific, and combinations thereof.

11. The method of claim 1, wherein haptic-response parameters include two or more of: amplitude, frequency, pulse rate, signal envelope, duration, signal extent/speed or fundamental frequency.

12. The method of claim 1, wherein semantic attributes include urgency material properties, intensity, enthusiasm reflected in a haptic response.

13. The method of claim 1, wherein the first application, second application and third application are different application types.

14. A wrist-wearable device comprising:
memory including a haptics library for determining whether to provide predefined haptic responses or parametrically-defined haptic responses;
one or more haptic generators; and
one or more processors configured to:
receive a first desired semantic attribute for a haptic response to be provided while a user is using a first application that is executing on a wrist-wearable device;
in accordance with a first determination, made by the haptics library that is distinct from the first application and that is configured to provide data used to generate haptic responses to a plurality of applications executing on the wrist-wearable device, that the wrist-wearable device should use a parametrically-defined haptic response instead of a predefined haptic response to deliver a haptic response having the first desired semantic attribute:
select, by the haptics library and using a first function that takes at least the first desired semantic attribute as an input, respective values for a first set of haptic-response parameters; and
provide instructions to cause a haptic generator of the one or more haptic generators to deliver a first parametrically-defined haptic response having the first desired semantic attribute using the respective values for the first set of haptic-response parameters;
receive a second desired semantic attribute, distinct from the first desired semantic attribute, for a haptic response to be provided while the user is using a second application that is executing on the wrist-wearable device; and
in accordance with a second determination, made by the haptics library, that the wrist-wearable device should use a second parametrically-defined haptic response instead of the predefined haptic response to deliver a haptic response having the second desired semantic attribute:
select, by the haptics library and using a second function that takes at least the second desired semantic attribute as an input, new respective values for a second set of haptic-response parameters, the new respective values being distinct from the respective values; and
provide instructions to cause the haptic generator of the one or more haptic generators to deliver the second parametrically-defined haptic response having the second desired semantic attribute using the respective values for the second set of haptic-response parameters.

15. The wrist-wearable device of claim 14, wherein the one or more processors are further configured to:
receive a third desired semantic attribute, distinct from the first desired semantic attribute and/or the second desired semantic attribute, for a haptic response to be provided while the user is using a third application that is executing on the wrist-wearable device;
in accordance with a third determination, made by the haptics library, that the wrist-wearable device should use a third parametrically-defined haptic response instead of a predefined haptic response to deliver a haptic response having the third desired semantic attribute:
select, by the haptics library and using a third function that takes at least the third desired semantic attribute as an input, respective values for a third set of haptic-response parameters, the respective values for the third set of haptic-response parameters being distinct from the respective values and new respective values; and
provide instructions to cause the haptic generator of the one or more haptic generators to deliver a third parametrically-defined haptic response having the third desired semantic attribute using the respective values for the third set of haptic-response parameters.

16. A non-transitory, computer-readable storage medium including instructions that, when executed by a system communicatively coupled with one or more electronic devices, cause the system to perform or cause performance of:
receiving a first desired semantic attribute for a haptic response to be provided while a user is using a first application that is executing on an electronic device;
in accordance with a first determination, made by a haptics library that is distinct from the first application and that is configured to provide data used to generate haptic responses to a plurality of applications executing on the electronic device, that the electronic device should use a parametrically-defined haptic response instead of a predefined haptic response to deliver a haptic response having the first desired semantic attribute:
selecting, by the haptics library and using a first function that takes at least the first desired semantic attribute as an input, respective values for a first set of haptic-response parameters; and
providing instructions to cause a haptic generator of the electronic device to deliver a first parametrically-defined haptic response having the first desired semantic attribute using the respective values for the first set of haptic-response parameters;
receiving a second desired semantic attribute, distinct from the first desired semantic attribute, for a haptic response to be provided while the user is using a second application that is executing on the electronic device; and in accordance with a second determination, made by the haptics library, that the electronic device should use a second parametrically-defined haptic response instead of the predefined haptic response to deliver a haptic response having the second desired semantic attribute:
- selecting, by the haptics library and using a second function that takes at least the second desired semantic attribute as an input, new respective values for a second set of haptic-response parameters, the new respective values being distinct from the respective values; and
- providing instructions to cause the haptic generator of the electronic device to deliver the second parametrically-defined haptic response having the second desired semantic attribute using the respective values for the second set of haptic-response parameters.

17. The non-transitory, computer-readable storage medium of claim 16, wherein the instructions further cause the system to perform or cause performance of:
- receiving a third desired semantic attribute, distinct from the first desired semantic attribute and/or the second desired semantic attribute, for a haptic response to be provided while the user is using a third application that is executing on the electronic device;
- in accordance with a third determination, made by the haptics library, that the electronic device should use a third parametrically-defined haptic response instead of a predefined haptic response to deliver a haptic response having the third desired semantic attribute:
- selecting, by the haptics library and using a third function that takes at least the third desired semantic attribute as an input, respective values for a third set of haptic-response parameters, the respective values for the third set of haptic-response parameters being distinct from the respective values and new respective values; and
- providing instructions to cause the haptic generator of the electronic device to deliver a third parametrically-defined haptic response having the third semantic attribute using the respective values for the third set of haptic-response parameters.

18. The non-transitory, computer-readable storage medium of claim 16, wherein the electronic device is a first electronic device and the instructions further cause the system to perform or cause performance of:
- receiving a fourth desired semantic attribute for a haptic response to be provided while the user is using a fourth application that is executing at a second electronic device;
- in accordance with a second determination, made by the haptics library, that the second electronic device should use a fourth parametrically-defined haptic response instead of a predefined haptic response to deliver a haptic response having the fourth desired semantic attribute:
- selecting, by the haptics library and using a fourth function that takes at least the fourth desired semantic attribute as an input, respective values for a fourth set of haptic-response parameters, the respective values for the fourth set of haptic-response parameters being distinct from the respective values and new respective values; and
- providing instructions to cause a second haptic generator of the electronic device to deliver a fourth parametrically-defined haptic response having the fourth desired semantic attribute using the respective values for the fourth set of haptic-response parameters.

19. The non-transitory, computer-readable storage medium of claim 16, wherein the first desired semantic attribute and the second desired semantic attribute are determined based on a user input.

20. The non-transitory, computer-readable storage medium of claim 16, wherein the electronic device is a wrist-wearable device, head-wearable device, and smartphone.

* * * * *